(12) United States Patent
Tsukano et al.

(10) Patent No.: US 11,667,275 B2
(45) Date of Patent: Jun. 6, 2023

(54) CONTROL APPARATUS OF VEHICLE

(71) Applicants: MAZDA MOTOR CORPORATION, Hiroshima (JP); IKUTOKU GAKUEN, Kanagawa (JP)

(72) Inventors: Takatoshi Tsukano, Hiroshima (JP); Masato Abe, Atsugi (JP); Makoto Yamakado, Atsugi (JP); Yoshio Kano, Atsugi (JP); Kazuki Sato, Atsugi (JP)

(73) Assignees: MAZDA MOTOR CORPORATION, Hiroshima (JP); IKUTOKU GAKUEN, Kanagawa (JP)

(*) Notice: Subject to any disclaimer, the term of this patent is extended or adjusted under 35 U.S.C. 154(b) by 352 days.

(21) Appl. No.: 16/969,930

(22) PCT Filed: Feb. 19, 2019

(86) PCT No.: PCT/JP2019/006071
§ 371 (c)(1),
(2) Date: Aug. 13, 2020

(87) PCT Pub. No.: WO2019/160159
PCT Pub. Date: Aug. 22, 2019

(65) Prior Publication Data
US 2021/0009108 A1 Jan. 14, 2021

(30) Foreign Application Priority Data

Feb. 19, 2018 (JP) .............................. JP2018-026781
Jun. 28, 2018 (JP) .............................. JP2018-123295

(51) Int. Cl.
*B60W 30/02* (2012.01)
*B60W 10/18* (2012.01)
(Continued)

(52) U.S. Cl.
CPC ............ *B60W 30/02* (2013.01); *B60W 10/18* (2013.01); *B60W 10/20* (2013.01); *B60W 40/13* (2013.01);
(Continued)

(58) Field of Classification Search
CPC ......... B60W 10/20; B60W 30/02–025; B60W 30/045; B60W 2720/125; B60W 2510/20;
(Continued)

(56) References Cited

U.S. PATENT DOCUMENTS 5,828,972 A * 10/1998 Asanuma ............... B62D 5/006
701/41
2011/0060505 A1 * 3/2011 Suzuki ...................... B60T 7/12
701/41

(Continued)

FOREIGN PATENT DOCUMENTS

| JP | 2008-126916 A | 6/2008 |
| JP | 2014-036532 A | 2/2014 |
| JP | 2017-190013 A | 10/2017 |

OTHER PUBLICATIONS

International Search Report issued in PCT/JP2019/006071; dated May 7, 2019.
Written Opinion issued in PCT/JP2019/006071; dated May 7, 2019.

*Primary Examiner* — Dale W Hilgendorf
*Assistant Examiner* — Frank T Glenn, III
(74) *Attorney, Agent, or Firm* — Studebaker & Brackett PC

(57) ABSTRACT

A control apparatus of a vehicle includes: a steering apparatus (6) including a steering wheel (11) operated in order to turn a vehicle (1) and a steering angle sensor (8) that detects a steering angle of the steering wheel (11), the steering apparatus (6) steering a front wheel (steered wheel) (2) of the vehicle (1) in accordance with operation of the steering wheel (11); and a controller (14) that sets a steering angle (Continued)

acceleration based on the steering angle detected by the steering angle sensor (8) and controls vehicle motion when the steering wheel (11) is operated to be turned. In particular, the controller (14) suppresses a rise of lateral acceleration of the vehicle (1) based on the steering angle acceleration in order to control the vehicle motion.

15 Claims, 15 Drawing Sheets

(51) Int. Cl.
  *B60W 10/20* (2006.01)
  *B60W 40/13* (2012.01)
(52) U.S. Cl.
  CPC . *B60W 2040/1315* (2013.01); *B60W 2510/20* (2013.01); *B60W 2510/24* (2013.01); *B60W 2530/203* (2020.02); *B60W 2530/209* (2020.02); *B60W 2710/205* (2013.01)

(58) Field of Classification Search
  CPC .......... B60W 10/18; B60W 40/13; B60W 2530/209; B60W 2530/203; B60W 2040/1315; B60W 2510/24; B60W 2710/205
  See application file for complete search history.

(56) References Cited

U.S. PATENT DOCUMENTS

| | | | |
|---|---|---|---|
| 2012/0283910 A1* | 11/2012 | Lee | B62D 1/286 701/41 |
| 2013/0060413 A1* | 3/2013 | Lee | B62D 6/00 701/23 |
| 2013/0060414 A1* | 3/2013 | Lee | B62D 1/286 701/23 |
| 2019/0054916 A1 | 2/2019 | Akiyama et al. | |

* cited by examiner

CONTROL APPARATUS OF VEHICLE

TECHNICAL FIELD

The present invention relates to a control apparatus of a vehicle that controls vehicle motion in accordance with the operation of a steering.

BACKGROUND ART

Hitherto, technologies that control vehicle motion such as lateral acceleration and a yaw rate generated in a vehicle have been proposed in order to achieve various objects when a driver operates a steering. For example, Patent Literature 1 discloses a technology of reducing discomfort of a steering reaction force when a steering is turned by controlling a driving force or a braking force applied to a vehicle based on the steering angle velocity. The steering described above means a steering wheel. In this description, the steering wheel is called "steering" for short, as appropriate.

CITATION LIST

Patent Literature

Patent Literature 1: Japanese Patent Laid-Open No. 2017-190013

SUMMARY OF INVENTION

Technical Problem

Incidentally, according to the research done by the inventors of the present invention, it has been found that, when a driver turns a steering in order to turn a vehicle, steering performed by the driver may become unstable due to the change in lateral acceleration generated in the vehicle. This matter is specifically described with reference to FIG. 16.

FIG. 16 shows one example of the lateral acceleration generated in the vehicle when the steering is operated to be turned. In FIG. 16, the horizontal axis indicates time and the vertical axis indicates the lateral acceleration. Reference numeral 101 denotes a target lateral acceleration to be generated in the vehicle when the steering is operated to be turned, and reference numeral 102 denotes the lateral acceleration (actual lateral acceleration) that is actually generated in the vehicle when the steering is operated to be turned. First, the actual lateral acceleration 102 sharply rises (see reference numeral 104) immediately after the driver starts the turning operation of the steering so as to be slightly delayed with respect to the start of the turning operation. This is because the steering angle acceleration (the change rate of the change velocity steering angle velocity) of the steering angle) greatly rises immediately after the start of the turning operation. When the actual lateral acceleration 102 sharply rises as above, the driver becomes surprised and temporarily stops the turning operation of the steering. As a result, the rise of the actual lateral acceleration 102 stops (see reference numeral 105). Then, the driver performs an additional turning operation (turns in an adding manner) of the steering, which greatly raises the actual lateral acceleration 102 again (see reference numeral 106). At this time, the actual lateral acceleration 102 overshoots the target lateral acceleration 101. After the above, the overshoot and the undershoot of the actual lateral acceleration 102 with respect to the target lateral acceleration 101 repeatedly occur in an alternating manner, and unstable steering continues (see reference numeral 107).

In order to provide a feeling of coherence between the steering operation performed by the driver and the vehicle behavior in accordance therewith to the driver when the vehicle is turned, the occurrence of unstable steering as described above is desired to be suppressed. In order to do so, it is conceived that it is desirable to control the vehicle motion so as to generate the lateral acceleration as expected with respect to the steering operation of the driver in the vehicle.

The present invention has been made in order to solve the problem of the related-art technology described above, and an object thereof is to provide a control apparatus of a vehicle capable of appropriately controlling vehicle motion so as to suppress unstable steering due to a change of vehicle lateral acceleration when a steering is operated to be turned.

Solution to Problem

In order to achieve the abovementioned object, the present invention is a control apparatus of a vehicle, the control apparatus being characterized by including: a steering apparatus including a steering operated in order to turn the vehicle and a steering angle sensor that detects a steering angle of the steering, the steering apparatus steering a steered wheel of the vehicle in accordance with operation of the steering; setting means for setting a steering angle acceleration based on the steering angle detected by the steering angle sensor; and vehicle motion controlling means for controlling vehicle motion when the steering is operated to be turned, wherein the vehicle motion controlling means controls the vehicle motion so as to suppress a rise of lateral acceleration of the vehicle based on the steering angle acceleration.

As described above, the steering angle acceleration greatly rises immediately after the start of the turning operation of the steering (steering wheel). Therefore, in the present invention, when the steering is operated to be turned, control for suppressing the rise of the lateral acceleration of the vehicle based on the steering angle acceleration is performed. As a result, in particular, a sudden rise of the lateral acceleration immediately after the start of the turning operation of the steering can be suppressed. Therefore, the unstable steering due to the change of the lateral acceleration at the time of the turning operation of the steering can be suppressed. For example, a case where the driver becomes surprised at the sharp lateral acceleration generation immediately after the start of the turning operation and the operation velocity of the steering is reduced (for example, the steering is stopped) can be appropriately suppressed.

The expression of "when the steering is operated to be turned" means that operation is performed on the steering by a predetermined steering angle or more. In other words, the expression means a time when steering (steering for turning) that is not so-called correction steering is performed.

In the present invention, the setting means preferably further sets a steering angle velocity based on the steering angle detected by the steering angle sensor, and the vehicle motion controlling means preferably increases the rise of the lateral acceleration of the vehicle based on the steering angle velocity while suppressing the rise of the lateral acceleration of the vehicle based on the steering angle acceleration.

According to the present invention configured as above, control for increasing the rise of the lateral acceleration of the vehicle is further performed based on the steering angle velocity, and hence the responsiveness (the responsiveness to the yaw rate and the lateral acceleration at the time of turning) of the vehicle with respect to the turning operation of the steering performed by the driver can be secured.

In the present invention, the setting means preferably further sets a steering angle velocity based on the steering angle detected by the steering angle sensor, the steering apparatus is preferably formed to be able to change a wheel angle of the steered wheel in a manner independent of the operation of the steering, and the vehicle motion controlling means preferably suppresses the rise of the lateral acceleration of the vehicle based on the steering angle acceleration by controlling the steering apparatus so as to change the wheel angle in a manner independent of the operation of the steering based on the steering angle, the steering angle velocity, and the steering angle acceleration.

According to the present invention configured as above, the suppression of the rise of the lateral acceleration based on the steering angle acceleration can be appropriately realized by controlling the steering apparatus so as to change, as appropriate, the wheel angle in a manner independent of the operation of the steering.

In the present invention, the vehicle motion controlling means preferably suppresses the rise of the lateral acceleration of the vehicle based on the steering angle acceleration by controlling a yaw moment of the vehicle based on the steering angle acceleration.

According to the present invention configured as above, the suppression of the rise of the lateral acceleration based on the steering angle acceleration can be appropriately realized by controlling the yaw moment applied to the vehicle.

In a suitable example, the vehicle motion controlling means is preferred to control the yaw moment by controlling at least one of a braking force and a driving force applied to the vehicle.

In a suitable example, a brake apparatus capable of applying different braking forces to left and right wheels is preferred to be further included, the setting means is preferred to further set a steering angle velocity based on the steering angle detected by the steering angle sensor, and the vehicle motion controlling means is preferred to control the yaw moment by controlling the brake apparatus so as to increase a braking applied to a turning outer wheel of the vehicle based on the steering angle acceleration and controlling the brake apparatus so as to increase a braking force applied to a turning inner wheel of the vehicle based on the steering angle velocity.

In another viewpoint, in order to achieve the abovementioned object, the present invention is a control apparatus of a vehicle, the control apparatus being characterized by including: a steering apparatus including a steering operated in order to turn the vehicle and a steering angle sensor that detects a steering angle of the steering, the steering apparatus steering a steered wheel in accordance with operation of the steering; setting means for setting a steering angle acceleration based on the steering angle detected by the steering angle sensor; and vehicle motion controlling means for controlling vehicle motion when the steering operated to be turned, wherein the vehicle motion controlling means suppresses a rise of lateral acceleration of the vehicle based on the steering angle acceleration in order to control the vehicle motion so as to suppress reduction of an operation velocity of the steering caused by a driver due to the lateral acceleration of the vehicle that rises in accordance with the turning operation of the steering.

The unstable steering due to the change of the lateral acceleration at the time of the turning operation of the steering can be suppressed also by the present invention configured as above.

In the present invention, the vehicle preferably includes a driving seat of which position is adjustable in a vehicle front-rear direction, a vehicle front-rear position of the driving seat is preferably set to be ahead of a center-of-gravity position of the vehicle in the vehicle front-rear direction, and the vehicle motion controlling means preferably suppresses the rise of the lateral acceleration of the vehicle more strongly when a distance between the vehicle front-rear position of the driving seat and the center-of-gravity position of the vehicle is large than when the distance is not large.

The sensitivity against the lateral acceleration of the driver changes depending on the distance between the vehicle front-rear position of the driving seat and the center-of-gravity position of the vehicle. Specifically, the driver easily feels the lateral acceleration when the distance is large, and the driver feels the lateral acceleration less easily when the distance is small. Therefore, according to the present invention, the suppressing degree of the rise of the lateral acceleration based on the steering angle acceleration can be appropriately changed in accordance with the sensitivity against the lateral acceleration of the driver that changes depending on the distance as above.

In the present invention, a sitting sensor that detects a sitting state other than a sitting state of the driving seat is preferably further included, and the vehicle motion controlling means preferably changes the center-of-gravity position of the vehicle based on the sitting state detected by the sitting sensor.

According to the present invention configured as above, the center-of-gravity position of the vehicle can be accurately acquired by taking the sitting state of the occupant (other than the driver) in the vehicle cabin into account.

In the present invention, the sitting sensor preferably detects sitting states of a passenger seat and a rear seat of the vehicle.

According to the present invention configured as above, the sitting state of the occupant in the vehicle cabin can be appropriately determined with use of the sitting sensor.

In the present invention, a remaining fuel amount sensor that detects a remaining fuel amount in a fuel tank of the vehicle is preferably further included, and the vehicle motion controlling means preferably changes the center-of-gravity position of the vehicle based on the remaining fuel amount detected by the remaining fuel amount sensor.

According to the present invention configured as above, the center-of-gravity position of the vehicle can be accurately acquired by taking the remaining fuel amount in the fuel tank into account.

In the present invention, towing state determining means for determining whether the vehicle is in a towing state is preferably further included, and the vehicle motion controlling means preferably changes the center-of-gravity position of the vehicle based on a determination result of the towing state determining means.

According to the present invention configured as above, the center-of-gravity position of the vehicle can be accurately acquired by taking the towing state of the vehicle into account.

In the present invention, the vehicle preferably includes a driving seat of which position is adjustable in a vehicle front-rear direction, and the vehicle motion controlling means preferably suppresses the rise of the lateral acceleration of the vehicle more strongly when a vehicle front-rear position of the driving seat is on a front side than when the vehicle front-rear position of the driving seat is not on the front side.

The suppressing degree of the rise of the lateral acceleration based on the steering angle acceleration can be appropriately changed in accordance with the sensitivity against the lateral acceleration of the driver that changes depending on the vehicle front-rear position of the driving seat (the driver easily feels the lateral acceleration when the driving seat position is on the front side, and the driver feels the lateral acceleration less easily when the driving seat position is on the rear side) also by the present invention configured as above.

Advantageous Effect of Invention

With the control apparatus of the vehicle of the present invention, the unstable steering due to the change of the vehicle lateral acceleration when the steering is operated to be turned can be suppressed.

DESCRIPTION OF EMBODIMENT

A control apparatus of a vehicle according to an embodiment of the present invention is described below with reference to the accompanying drawings.

<Apparatus Configuration>

Figure 1:
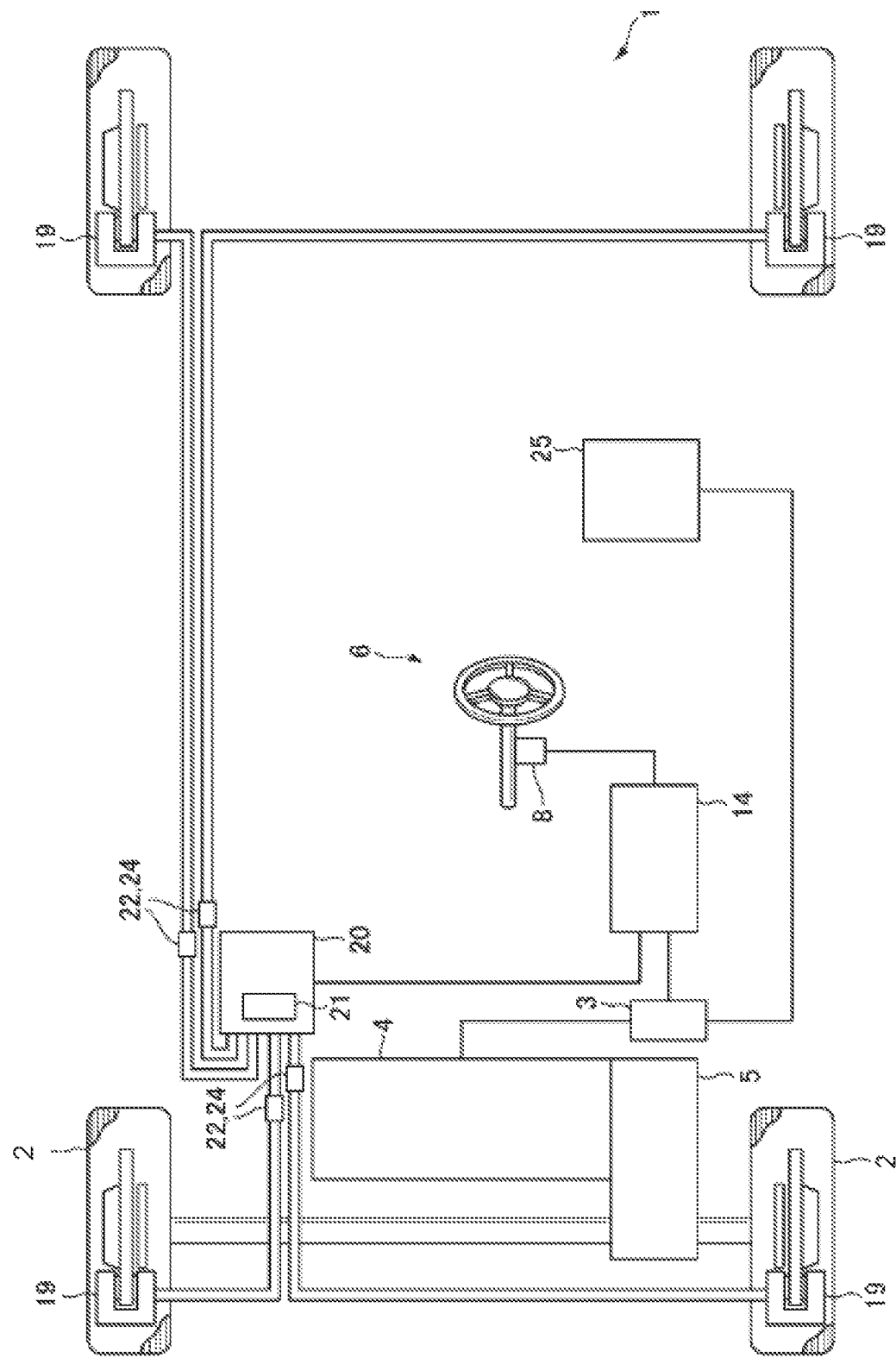
FIG. 1 is a schematic configuration diagram of a vehicle to which a control apparatus of a vehicle according to an embodiment of the present invention is applied.
Figure 2:
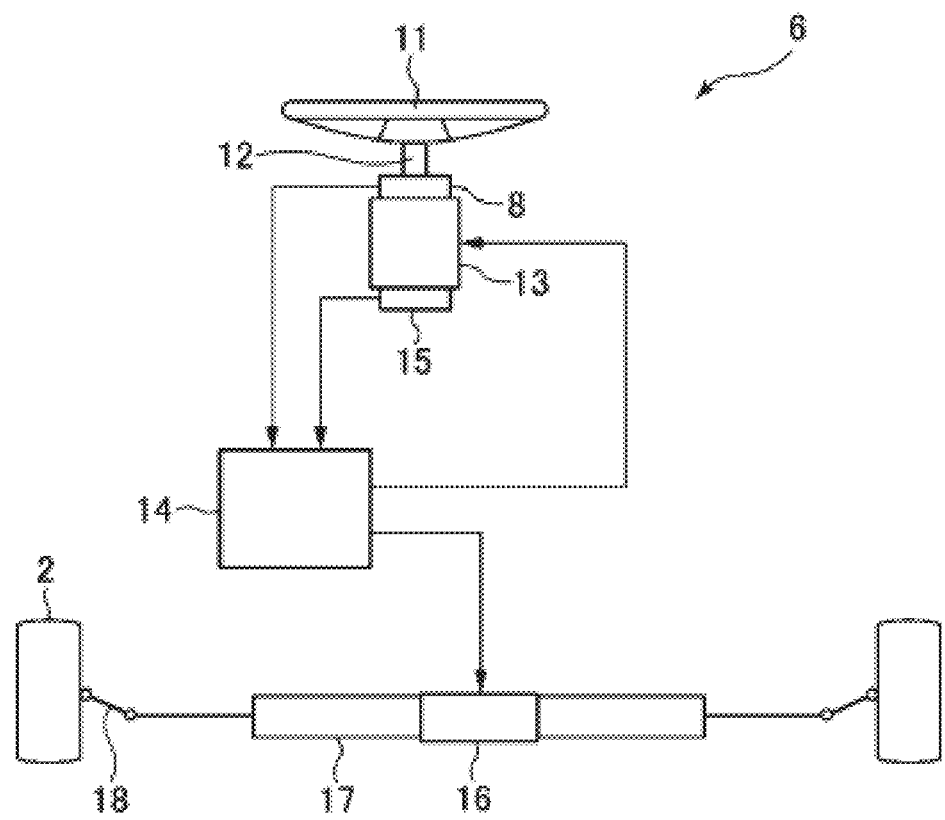
FIG. 2 is a schematic configuration diagram of a steering apparatus included in the control apparatus of the vehicle according to the embodiment of the present invention.
Figure 3:
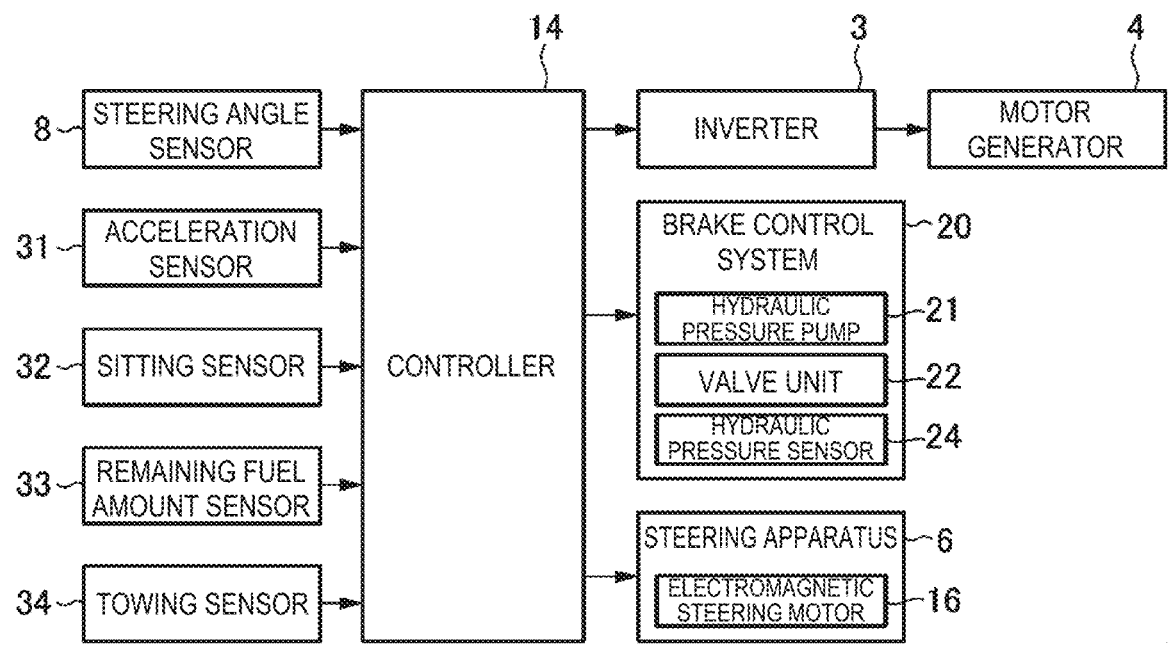
FIG. 3 is a block diagram illustrating an electrical configuration of the control apparatus of the vehicle according to the embodiment of the present invention.

First, with reference to FIG. 1 to FIG. 3, the configuration of the control apparatus of the vehicle according to the embodiment of the present invention is described. FIG. 1 is a schematic configuration diagram of the vehicle to which the control apparatus of the vehicle according to the embodiment of the present invention is applied, FIG. 2 is a schematic configuration diagram of a steering apparatus included in the control apparatus of the vehicle according to the embodiment of the present invention, and FIG. 3 is a block diagram illustrating an electrical configuration of the control apparatus of the vehicle according to the embodiment of the present invention.

In FIG. 1, reference numeral 1 denotes a vehicle in which the control apparatus of the vehicle according to this embodiment is installed. In the vehicle 1, a motor generator 4 having a function of driving front wheels 2 (in other words, a function as an electric motor) and a function of performing regenerative power generation by being driven by the front wheels 2 (in other words, a function as a power generator) is installed. Power is transmitted between the motor generator 4 and the front wheels 2 via a decelerator 5, and the motor generator 4 is controlled by a controller 14 via an inverter 3. The motor generator 4 is connected to a battery 25. Electric power is supplied to the motor generator 4 from the battery 25 when the driving force is generated, and the motor generator 4 charges the battery 25 by supplying electric power to the battery 25 when regeneration is performed.

The vehicle 1 includes a brake control system 20 that supplies a brake hydraulic pressure to brake calipers of brake apparatuses (braking apparatuses) 19 provided in the wheels. The brake control system 20 includes a hydraulic pressure pump 21 that generates a brake hydraulic pressure necessary for generating the braking force in the brake apparatuses 19 provided in the wheels, valve units 22 (specifically, solenoid valves) that are provided in hydraulic pressure supply lines to the brake apparatuses 19 of the wheels and for controlling the hydraulic pressure supplied from the hydraulic pressure pump 21 to the brake apparatuses 19 of the wheels, and hydraulic pressure sensors 24 that detect the hydraulic pressure supplied from the hydraulic pressure pump 21 to the brake apparatuses 19 of the wheels. The hydraulic pressure sensors 24 are disposed in connection portions between the valve units 22 and the hydraulic pressure supply lines on the downstream side thereof, for example, detect the hydraulic pressure on the downstream side of the valve units 22, and output detection values to the controller 14.

The brake control system 20 calculates the hydraulic pressure independently supplied to a wheel cylinder and the brake caliper of each of the wheels based on a braking force command value input from the controller 14 and the detection value of the hydraulic pressure sensor 24, and controls the rotating speed of the hydraulic pressure pump 21 and the opening of the valve units 22 in accordance with the hydraulic pressure.

The vehicle 1 includes a steering apparatus 6 that steers the front wheels 2 serving as steered wheels (wheels that are steered) in accordance with the operation of a steering wheel (steering) 11 performed by the driver. As illustrated in FIG. 2, the steering apparatus 6 is formed as a steer-by-wire system in which a mechanism for transmitting the rotation of the steering wheel 11 and a mechanism for steering the front wheels 2 in accordance with the rotation of the steering wheel 11 are mechanically separated from each other.

Specifically, the steering apparatus 6 includes the steering wheel 11 operated by the driver, a steering shaft 12 that rotates together with the steering wheel 11, an electric motor 13 that is provided on the steering shaft 12, generates a torque (typically, a reaction force torque), and adds the torque to the steering shaft 12, a steering angle sensor 8 that detects the steering angle (rotation angle) of the steering shaft 12, and a torque sensor 15 that detects the steering torque applied by the driver via the steering wheel 11. The steering apparatus 6 includes an electromagnetic steering motor 16 that generates a torque for steering the front wheels 2, a rack shaft 17 that is operated by the torque of the electromagnetic steering motor 16, and a tie rod 18 that steers the front wheels 2 by the operation of the rack shaft 17.

Next, as illustrated in FIG. 3, detection signals are input to the controller 14 from an acceleration sensor 31 that detects acceleration generated in the vehicle 1, a sitting sensor 32 that detects the sitting state of at least seats other than the driving seat, specifically, a passenger seat and a rear seat, a remaining fuel amount sensor 33 that detects the remaining fuel amount in a fuel tank provided in a rear portion of the vehicle 1, and a towing sensor 34 that detects the towing state of the vehicle 1, other than the steering angle sensor 8 described above. The sitting sensor 32 is provided on each of the passenger seat and the rear seat. The sitting sensor 32 provided on the passenger seat outputs an ON signal when an occupant is sitting on the passenger seat, and the sitting sensor 32 provided on the rear seat outputs an ON signal when an occupant is sitting on the rear seat. The towing sensor 34 outputs an ON signal when the vehicle 1 is in the towing state.

The controller 14 according to this embodiment controls the motor generator 4, the steering apparatus 6, the brake control system 20, and the like based on the detection signals output by various sensors as those described above. Specifically, the controller 14 outputs a control signal to the inverter 3 so as to generate a driving force (driving torque) to be applied to the vehicle 1 from the motor generator 4 when the vehicle 1 is driven. Meanwhile, the controller 14 outputs a control signal to the inverter 3 so as to generate the braking force to be applied to the vehicle 1 from the motor generator 4 (in other words, so as to generate the braking force by performing regeneration of the motor generator 4) when the brakes are applied to the vehicle 1. The controller 14 may output a control signal to the brake control system 20 so as to generate the braking force from the brake apparatuses 19 instead of performing regeneration of the motor generator 4 as above or in addition to performing regeneration of the motor generator 4 when the brakes are applied to the vehicle 1. In this case, the controller 14 generates a desired braking force by the brake apparatuses 19 by controlling the hydraulic pressure pump 21 and the valve units 22 of the brake control system 20.

The controller 14 controls the electromagnetic steering motor 16 to steer the front wheels 2 in accordance with the rotation of the steering wheel 11 based on the steering angle detected by the steering angle sensor 8. The wheel angle of the front wheels 2 is basically set at an angle corresponding to the steering angle of the steering wheel 11. However, in the steer-by-wire steering apparatus 6, the wheel angle of the front wheels 2 can be changed by the electromagnetic steering motor 16 in a manner independent of the steering angle of the steering wheel 11. The controller 14 controls the torque according to the electric motor 13 based on the steering torque and the like detected by the torque sensor 15 in order to apply a torque for informing the driver of the road surface state to the steering wheel 11 by the electric motor 13.

The controller 14 as above is formed by a computer including one or more processors, various programs (including a basic control program such as an OS and an application program that realizes a predetermined function by being started on the OS) interpreted and executed on the processor, and an internal memory such as a ROM and a RAM for storing therein the programs and various data. Although details thereof are described below, the controller 14 is equivalent to the control apparatus of the vehicle in the present invention. The controller 14 functions as setting means and vehicle motion controlling means in the present invention.

In FIG. 1, the vehicle 1 (equivalent to an electric automobile (EV vehicle)) driven by the motor generator 4 is illustrated, but the present invention is not limited to being applied to the EV vehicle, and can also be applied to general vehicles driven by an engine and vehicles (hybrid vehicles (HEV vehicles)) driven by an engine and a motor generator.

In FIG. 2, an example in which the rotation angle (the angle detected by the steering angle sensor 8) of the steering shaft 12 connected to the steering wheel 11 is used as the steering angle is illustrated, but various state quantities (the rotation angle of the electric motor 13 or the electromagnetic steering motor 16, the displacement of the rack shaft 17, and the like) in a steering system may be used as the steering angle instead of the rotation angle of the steering shaft 12 or in addition to the rotation angle of the steering shaft 12.

In the example illustrated in FIG. 3, the towing sensor 34 functions as towing state determining means in the present invention, but the towing state may be determined by the controller 14 without using the towing sensor 34 in other examples. Specifically, the controller 14 may determine whether the vehicle 1 is in the towing state based on the difference between a target acceleration specified in accordance with the accelerator opening and the like and an actual acceleration detected by the acceleration sensor 31. In this case, the controller 14 functions as the towing state determining means in the present invention.

<Vehicle Motion Control>

Next, vehicle motion control according to the embodiment of the present invention is described. First, the outline of the vehicle motion control according to this embodiment is briefly described. In this embodiment, the controller 14 controls the vehicle motion in order to suppress unstable steering due to the lateral acceleration (typically, a sudden rise of the lateral acceleration immediately after the start of the turning operation) of the vehicle 1 when the steering wheel 11 is operated to be turned as described with reference to FIG. 16.

Figure 4:
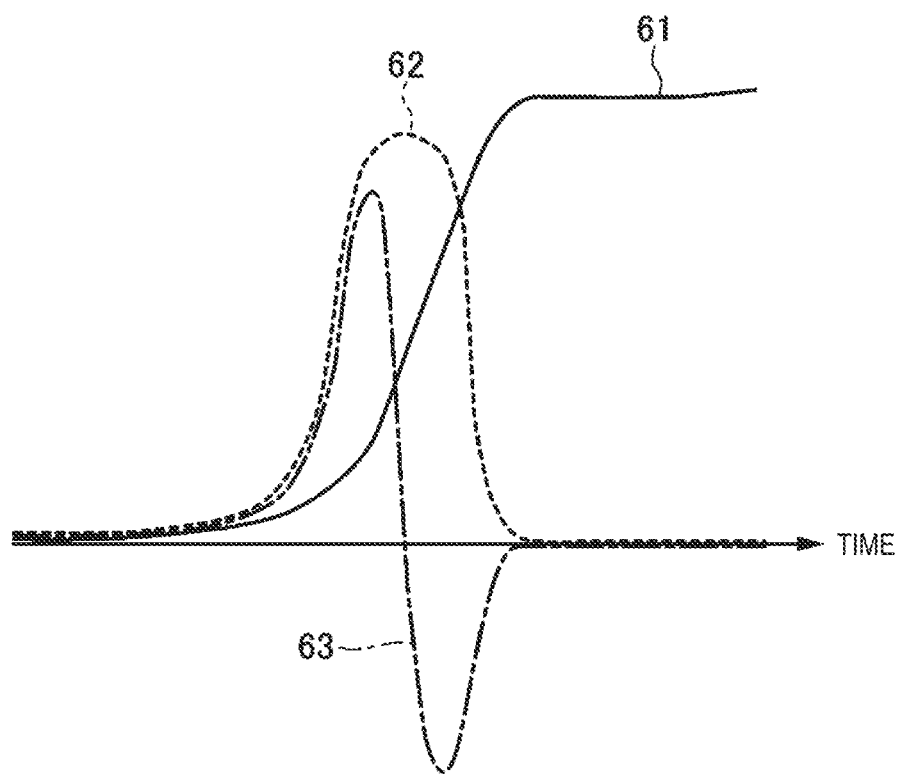
FIG. 4 is an explanatory diagram of the relationship between the steering angle, the steering angle velocity, and the steering angle acceleration when a steering is operated to be turned.

Now, with reference to FIG. 4, the relationship between the steering angle, the steering angle velocity (the change velocity of the steering angle), and the steering angle acceleration (the change rate of the change velocity (steering angle velocity) of the steering angle) when the turning operation of the steering wheel 11 is performed is described. In FIG. 4, reference numeral 61 denotes the steering angle, reference numeral 62 denotes the steering angle velocity, and reference numeral 63 denotes the steering angle acceleration. As illustrated in FIG. 4, at the start of the turning operation of the steering wheel 11, the steering angle acceleration rises greatly, in other words, the steering angle acceleration rises in a step-like form. As a result, as described in FIG. 16, a sudden rise of the lateral acceleration is conceived to occur immediately after the start of the turning operation.

Therefore, in this embodiment, the controller 14 performs control that, suppresses the rise of the lateral acceleration based on the steering angle acceleration, in other words, performs control of reducing the rising degree of the lateral acceleration. By doing so, a sudden rise of the lateral acceleration immediately after the start of the turning operation is suppressed and the steering at the time of the turning operation is stabilized. In particular, a case where the driver becomes surprised at the sharp lateral acceleration generation and the operation velocity of the steering wheel 11 decreases (for example, the stopping of the steering) is suppressed.

In this embodiment, the controller 14 performs control so as to suppress the rise of the lateral acceleration for the steering angle acceleration as described above, but performs control so as to increase the rise of the lateral acceleration based on the steering angle velocity for the steering angle velocity. By increasing the rise of the lateral acceleration based on the steering angle velocity as above, the responsiveness (the responsiveness to the yaw rate and the lateral acceleration at the time of turning) of the vehicle 1 with respect to the turning operation of the driver is secured.

In this embodiment, when the rise of the lateral acceleration is suppressed based on the steering angle acceleration as described above, the following is performed. When the controller 14 is on the front side of a vehicle front-rear position (hereinafter simply referred to as a "driving seat position") of the driving seat, the rise of the lateral acceleration is suppressed more strongly than when the controller 14 is not on the front side. The above is performed because the driver easily feels the lateral acceleration when the driving seat position is on the front side because the driving seat tends to be away from a vehicle center-of-gravity position. From the viewpoint as above, in this embodiment, the controller 14 acquires the distance between the driving seat position and the vehicle center-of-gravity position, and changes the suppressing degree of the rise of the lateral acceleration based on the steering angle acceleration in accordance with the distance.

Figure 5:
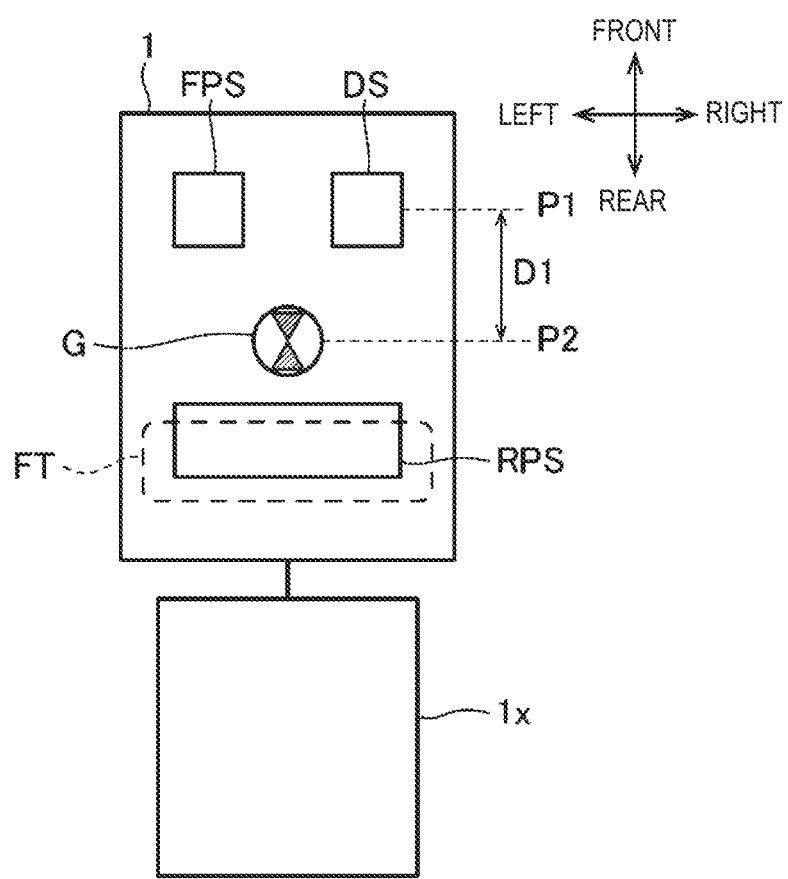
FIG. 5 is an explanatory diagram of vehicle motion control in accordance with a driving seat position according to the embodiment of the present invention.

FIG. 5 is an explanatory diagram of the content of the vehicle motion control in accordance with the driving seat position according to the embodiment of the present invention. In FIG. 5, reference numeral DS denotes the driving seat, reference numeral G denotes the center of gravity of the vehicle, reference numeral P1 denotes the driving seat position, and reference numeral P2 denotes the vehicle center-of-gravity position. As illustrated in FIG. 5, in the vehicle 1, the driving seat position P1 is set to be ahead of the vehicle center-of-gravity position P2 in the front-rear direction. In this embodiment, the controller 14 increases the suppressing degree of the rise of the lateral acceleration based on the steering angle acceleration when a distance D1 between the driving seat position P1 and the vehicle center-of-gravity position P2 is relatively large. In other words, the controller 14 reduces the suppressing degree of the rise of the lateral acceleration based on the steering angle acceleration when the distance D1 between the driving seat position P1 and the vehicle center-of-gravity position P2 is relatively small. As a result, the suppressing degree of the rise of the lateral acceleration based on the steering angle acceleration can be appropriately changed in accordance with the sensitivity against the lateral acceleration of the driver that changes depending on the distance D1 between the driving seat position P1 and the vehicle center-of-gravity position P2.

In this embodiment, as illustrated in FIG. 5, the controller 14 acquires the vehicle center-of-gravity position P2 described above based on the sitting state other than that of the driving seat DS (specifically, a passenger seat FPS and a rear seat RPS), the remaining fuel amount in a fuel tank FT, and the towing state of the vehicle 1 (in other words, whether the vehicle 1 is towing a vehicle 1x to be towed). The above is performed because the center-of-gravity position P2 of the vehicle 1 fluctuates in the front-rear direction in accordance with whether there is an occupant in the passenger seat FPS and the rear seat RPS, the degree of the remaining fuel amount in the fuel tank FT, and whether there is the vehicle 1x to be towed.

Specific embodiments (first and second embodiments) of the vehicle motion control executed in order to realize the control of the lateral acceleration based on the steering angle acceleration and the steering angle velocity as described above are described below.

First Embodiment

First, vehicle motion control according to the first embodiment of the present invention is described. In the first embodiment, the controller 14 realizes the control of the lateral acceleration based on the steering angle acceleration and the steering angle velocity by controlling the steering apparatus 6 so as to change the wheel angle of the front wheels 2 in a manner independent of the operation of the steering wheel 11 performed by the driver. Specifically, when the steering wheel 11 is operated to be turned, the controller 14 sets a wheel angle (hereinafter referred to as a "first wheel angle") in accordance with the steering angle acceleration, sets a wheel angle (hereinafter referred to as a "second wheel angle") in accordance with the steering angle velocity, and sets a target wheel angle applied to the front wheels 2 based on the first wheel angle, the second wheel angle, and the actual steering angle of the steering wheel 11.

In detail, the controller 14 sets the first wheel angle so as to reduce the wheel angle (the wheel angle corresponding to the turning operation of the steering wheel 11) corresponding to the steering angle based on the steering angle acceleration, in other words, so as to return the wheel angle to a side opposite from the turning direction in order to suppress the rise of the lateral acceleration based on the steering angle acceleration. Meanwhile, the controller 14 sets the second wheel angle so as to increase the wheel angle corresponding to the steering angle based on the steering angle velocity, in other words, so as to advance the wheel angle more to the turning direction side in order to increase the rise of the lateral acceleration based on the steering angle velocity. The controller 14 sets the target wheel angle by adding the first wheel angle (negative value) and the second wheel angle (positive value) to the wheel angle (positive value) corresponding to the steering angle. In other words, the controller 14 causes the wheel angle corresponding to the steering angle that is the result of turning the steering wheel 11 to return to the side opposite from the turning direction by the first wheel angle and advance to the turning direction side by the second wheel angle.

Figure 6:
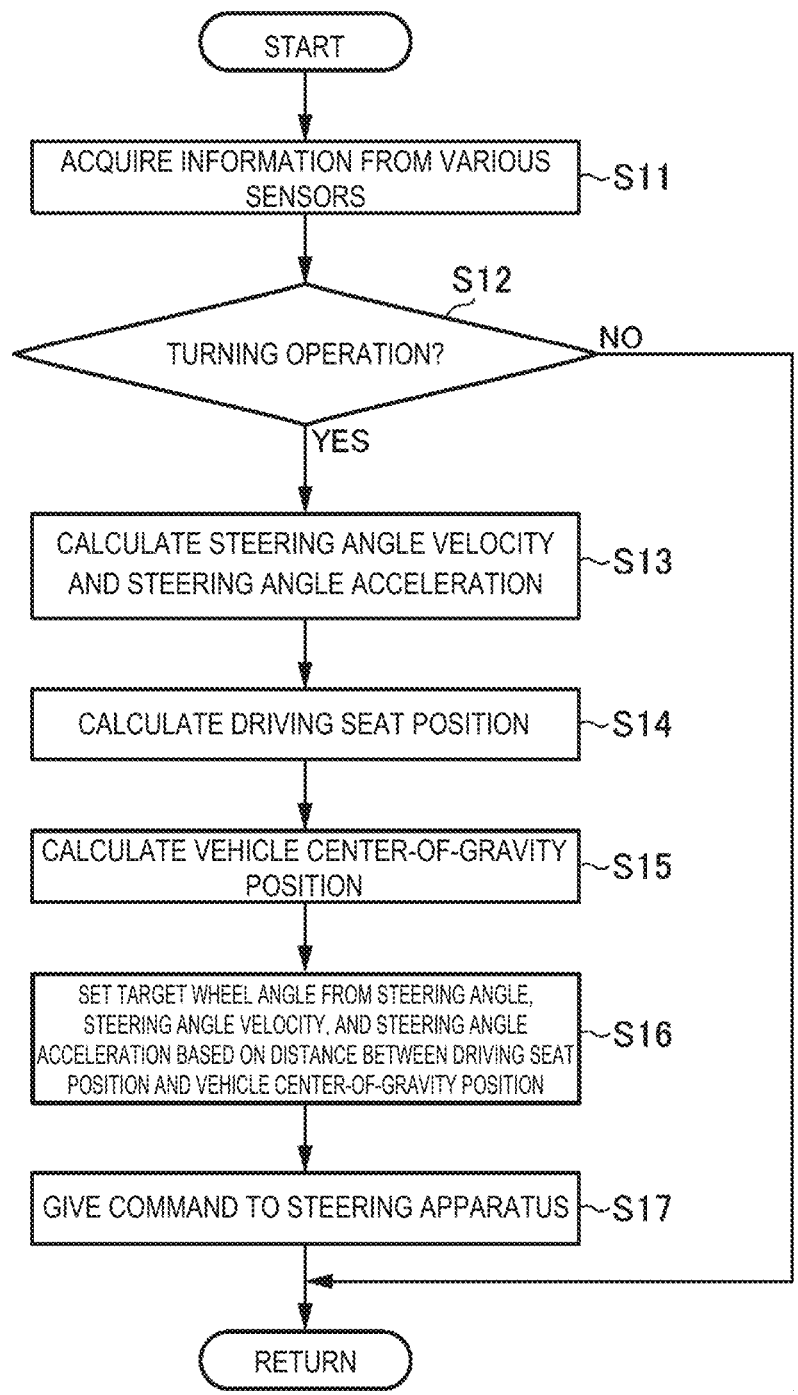
FIG. 6 is a flowchart of vehicle motion control processing according to a first embodiment of the present invention.
Figure 7:
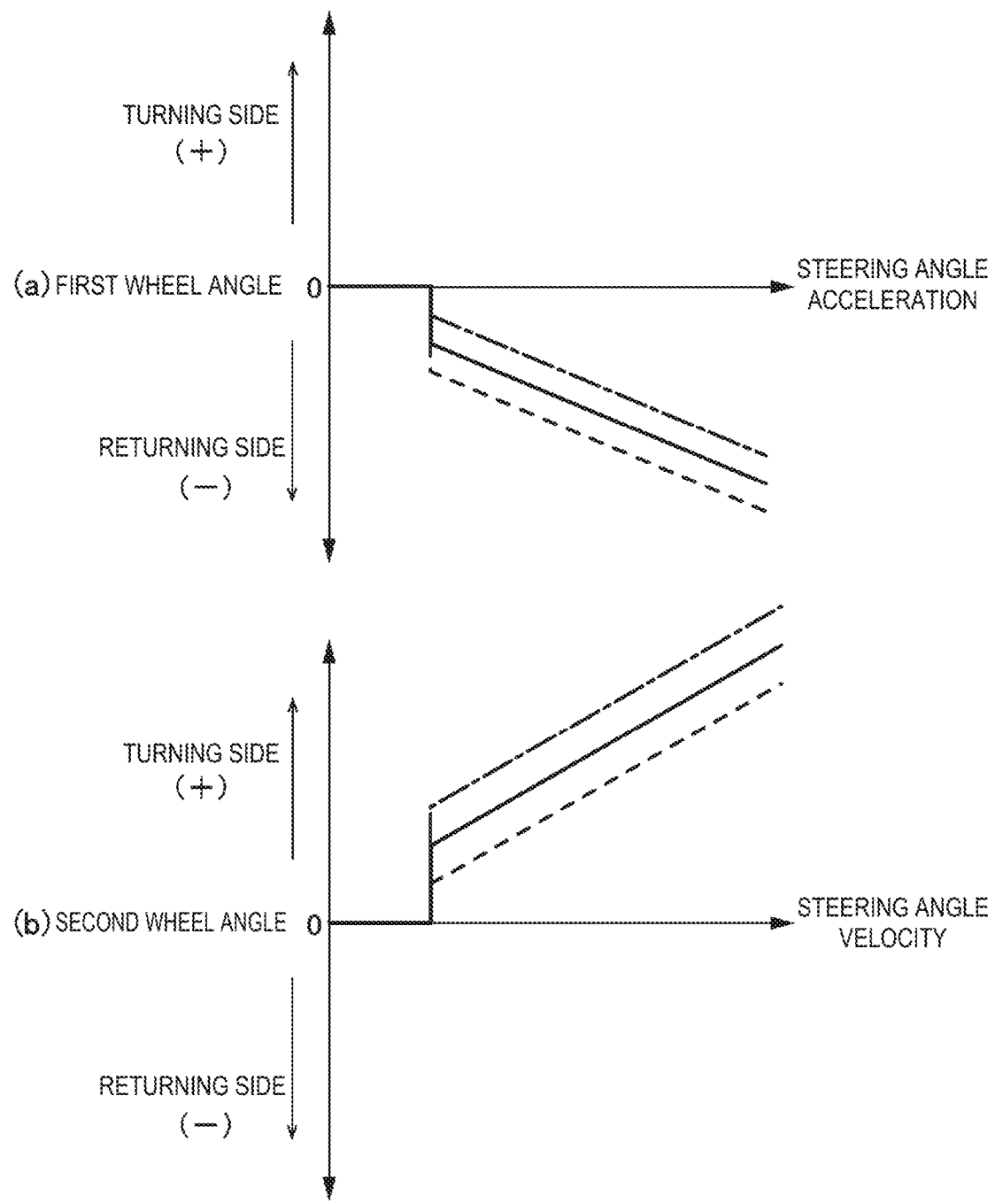
FIG. 7 shows maps of a first wheel angle and a second wheel angle according to the first embodiment of the present invention.

Next, with reference to FIG. 6 and FIG. 7, the vehicle motion control according to the first embodiment of the present invention is specifically described. FIG. 6 is a flowchart of the vehicle motion control processing according to the first embodiment of the present invention, and FIG. 7 shows maps of the first wheel angle and the second wheel angle according to the first embodiment of the present invention.

The vehicle motion control processing in FIG. 6 is activated when an ignition of the vehicle 1 is turned on and power is supplied to the controller 14, and the vehicle motion control processing is repeatedly executed for a predetermined period (for example, 50 ms).

When the vehicle motion control processing starts, the controller 14 acquires information relating to the operational state of the vehicle 1 from various sensors first in Step S11. In particular, the controller 14 acquires the steering angle detected by the steering angle sensor 8. Other than the above, the controller 14 acquires detection signals from the sitting sensor 32, the remaining fuel amount sensor 33, the towing sensor 34, and the like.

Next, in Step S12, the controller 14 determines whether the steering wheel 11 is being operated to be turned. Specifically, the controller 14 determines that the steering wheel 11 is being operated to be turned when the steering angle (absolute value) acquired in Step S11 is increasing. The controller 14 proceeds to Step S13 when it is determined that the steering wheel 11 is being operated to be turned (Step S12: Yes) as a result of the determination in Step S12 as above, and the vehicle motion control processing ends when it is determined that the steering wheel 11 is not being operated to be turned (Step S12: No).

Next, in Step S13, the controller 14 acquires the steering angle velocity and the steering angle acceleration from the steering angle acquired in Step S11. In one example, the controller 14 acquires the amount of change of the steering angle per unit time (in other words, differentiates the steering angle), sets the amount of change as the steering angle velocity, acquires the amount of change of the steering angle velocity per unit time (in other words, differentiates the steering angle velocity), and sets the amount of change as the steering angle acceleration.

Next, in Step S14, the controller 14 acquires the driving seat position. In one example, when the position of the driving seat is adjustable by a motor (in other words, when the driving seat is a power seat), the controller 14 acquires the driving seat position based on a control signal supplied to the motor. In another example, when the position of the driving seat is not adjustable by a motor, a position sensor that can detect the driving seat position is provided on the driving seat, and the controller 14 acquires the driving seat position based on the detection signal of the position sensor.

Next, in Step S15, the controller 14 acquires the vehicle center-of-gravity position. Specifically, the controller 14 acquires a vehicle center-of-gravity position (hereinafter referred to as a "reference center-of-gravity position") serving as a reference in accordance with the vehicle specifications first. The reference center-of-gravity position is acquired in advance and is stored in a memory, and the controller 14 reads out the reference center-of-gravity position from the memory. The controller 14 then corrects the reference center-of-gravity position based on the sitting state of the occupant, the remaining fuel amount in the fuel tank FT, and the towing state of the vehicle 1. Specifically, the controller 14 corrects the reference center-of-gravity position by the procedure as follows.

First, the controller 14 corrects the reference center-of-gravity position in accordance with the sitting state of the occupant in the vehicle 1 detected by the sitting sensor 32. For example, when the occupant is the sitting on the passenger seat FPS, the controller 14 corrects the reference center-of-gravity position more to the front side than when the occupant is not sitting on the passenger seat FPS. When the occupant is sitting on the rear seat RPS, the controller 14 corrects the reference center-of-gravity position more to the rear side than when the occupant is not sitting on the rear seat RPS. The controller 14 corrects the reference center-of-gravity position in accordance with the remaining fuel amount in the fuel tank FT detected by the remaining fuel amount sensor 33. Specifically, the controller 14 corrects the reference center-of-gravity position more to the rear side as the remaining fuel amount increases because the weight of the vehicle 1 on the rear portion side increases. The controller 14 corrects the reference center-of-gravity position in accordance with the towing state of the vehicle 1 detected by the towing sensor 34. Specifically, when the vehicle 1 is towing the vehicle 1x to be towed, the controller 14 corrects the reference center-of-gravity position more to the rear side than when the vehicle 1 is not towing the vehicle 1x to be towed.

Next, in Step S16, the controller 14 sets the target wheel angle applied to the front wheels 2 based on the steering angle acquired in Step S11 and the steering angle velocity and the steering angle acceleration acquired in Step S13. Specifically, the controller 14 sets the first wheel angle based on the steering angle acceleration, sets the second wheel angle based on the steering angle velocity, and sets the target wheel angle based on the first wheel angle, the second wheel angle, and the steering angle. In this case, the controller 14 corrects the first wheel angle in accordance with the steering angle acceleration and corrects the second wheel angle in accordance with the steering angle velocity based on the distance between the driving seat position acquired in Step S14 and the vehicle center-of-gravity position acquired in Step S15, and sets the target wheel angle from the first wheel angle and the second wheel angle corrected as above.

In detail, the controller 14 sets the first wheel angle based on the steering angle acceleration and sets the second wheel angle based on the steering angle velocity with use of the maps in FIG. 7. The solid line in FIG. 7(a) indicates the map defining the first wheel angle (vertical axis) to be set in accordance with the steering angle acceleration (horizontal axis). The map is defined such that, when the steering angle acceleration is equal to or more than a predetermined value (the first wheel angle is 0 when the steering angle acceleration is less than the predetermined value), the first wheel angle is set to a larger angle on the returning side (negative direction) as the steering angle acceleration increases. By doing so, in particular, a sudden rise of the lateral acceleration in accordance with the rise of the steering angle acceleration immediately after the start of the turning operation of the steering wheel 11 is suppressed.

The controller 14 corrects the first wheel angle set based on the steering angle acceleration as above based on the distance between the driving seat position and the vehicle center-of-gravity position. Specifically, the controller 14 corrects the first wheel angle to an angle on the returning side (see the broken line in FIG. 7(a)) when the distance between the driving seat position and the vehicle center-of-gravity position is large. When the distance is large, the driver easily feels the lateral acceleration, and hence the suppressing degree of the rise of the lateral acceleration based on the steering angle acceleration is increased by correcting the first wheel angle to the returning side. Meanwhile, when the distance between the driving seat position and the vehicle center-of-gravity position is small, the controller 14 corrects the first wheel angle to an angle on the turning side (see the long dashed short dashed line in FIG. 7(*a*)). When the distance is small, the driver feels the lateral acceleration less easily, and hence the suppressing degree of the rise of the lateral acceleration based on the steering angle acceleration is reduced by correcting the first wheel angle to the turning side.

Meanwhile, the solid line in FIG. 7(*b*) indicates a map defining the second wheel angle (vertical axis) to be set in accordance with the steering angle velocity (horizontal axis). The map is defined such that, when the steering angle velocity is equal to or more than a predetermined value (the second wheel angle is 0 when the steering angle velocity is less than the predetermined value), the second wheel angle is set to a larger angle on the turning side (positive direction) as the steering angle velocity increases. By doing so, the responsiveness (the responsiveness to the yaw rate and the lateral acceleration at the time of turning) of the vehicle 1 with respect to the turning operation of the driver is secured. In other words, the degradation of the responsiveness due to the suppression of the lateral acceleration rise based on the steering angle acceleration as described above (in particular, excessive suppression of the lateral acceleration rise) is suppressed.

The controller 14 corrects the second wheel angle set based on the steering angle velocity as above, based on the distance between the driving seat position and the vehicle center-of-gravity position. Specifically, the controller 14 corrects the second wheel angle to an angle on the returning side (see the broken line in FIG. 7(*b*)) when the distance between the driving seat position and the vehicle center-of-gravity position is large. The reason why the second wheel angle is corrected to the returning side is that the degradation of the responsiveness relating to the lateral acceleration as described above does not easily occur because the driver easily feels the lateral acceleration when the distance is large. Meanwhile, the controller 14 corrects the second wheel angle to an angle on the turning side (see the long dashed short dashed line in FIG. 7(*b*)) when the distance between the driving seat position and the vehicle center-of-gravity position is small. The reason why the second wheel angle is corrected to the turning side is that the degradation of the responsiveness relating to the lateral acceleration as described above easily occurs because the driver feels the lateral acceleration less easily when the distance is small.

The change rate (absolute value) of the first wheel angle in accordance with the steering angle acceleration in the map of FIG. 7(*a*) is preferred to be smaller than the change rate (absolute value) of the second wheel angle in accordance with the steering angle velocity in the map of FIG. 7(*b*). This is in order to prevent a case where the suppression of the lateral acceleration rise based on the steering angle acceleration becomes excessive and discomfort is given to the driver.

The first wheel angle and the second wheel angle are not limited to being linearly changed in accordance with the steering angle acceleration and the steering angle velocity. For example, the first wheel angle and the second wheel angle may be quadratically or exponentially changed in accordance with the steering angle acceleration and the steering angle velocity.

Returning to FIG. 6, in Step S16, the controller 14 sets the target wheel angle applied to the front wheels 2 by adding the first wheel angle (negative value) and the second wheel angle (positive value) set as above to the wheel angle (positive value) corresponding to the steering angle. When the first wheel angle is larger than the second wheel angle as absolute values, an angle smaller than the wheel angle corresponding to the steering angle is set as the target wheel angle. Meanwhile, when the first wheel angle is smaller than the second wheel angle as absolute values, an angle larger than the wheel angle corresponding to the steering angle is set as the target wheel angle.

A map to which the wheel angle of the front wheels 2 to be set with respect to the steering angle of the steering wheel 11 is associated is defined in advance in accordance with vehicle speed, for example, and the controller 14 sets a wheel angle in accordance with the steering angle detected by the steering angle sensor 8 as the wheel angle corresponding to the steering angle with reference to such map.

Next, in Step S17, the controller 14 sets a command value (control signal) of the electromagnetic steering motor 16 of the steering apparatus 6 such that the actual wheel angle of the front wheels 2 becomes the target wheel angle set in Step S16. Then, the controller 14 outputs the command value to the electromagnetic steering motor 16. After Step S17, the controller 14 ends the vehicle motion control processing.

Figure 8:
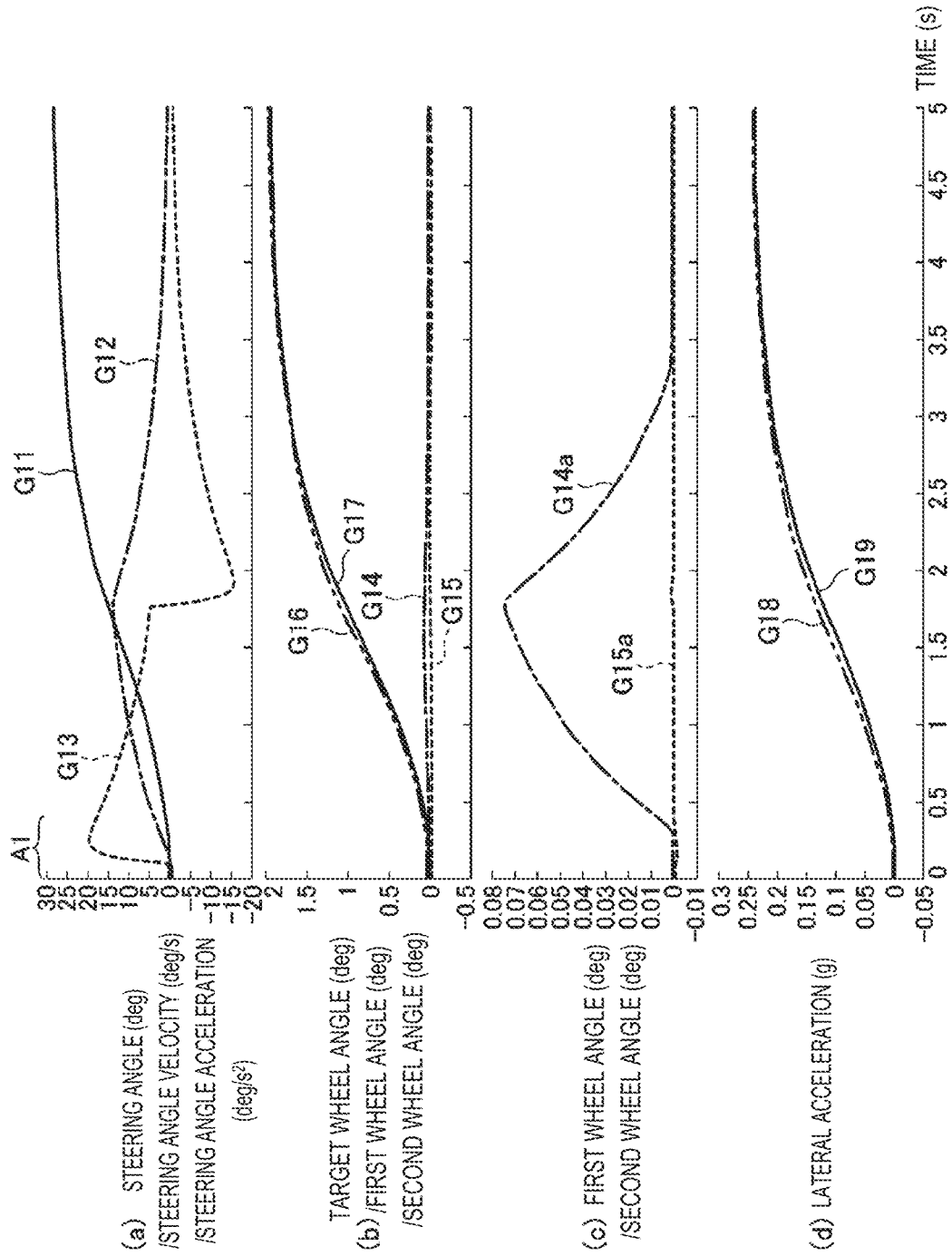
FIG. 8 shows time charts showing the time change of various parameters obtained when vehicle motion control according to the first embodiment of the present invention is executed.
Figure 9:
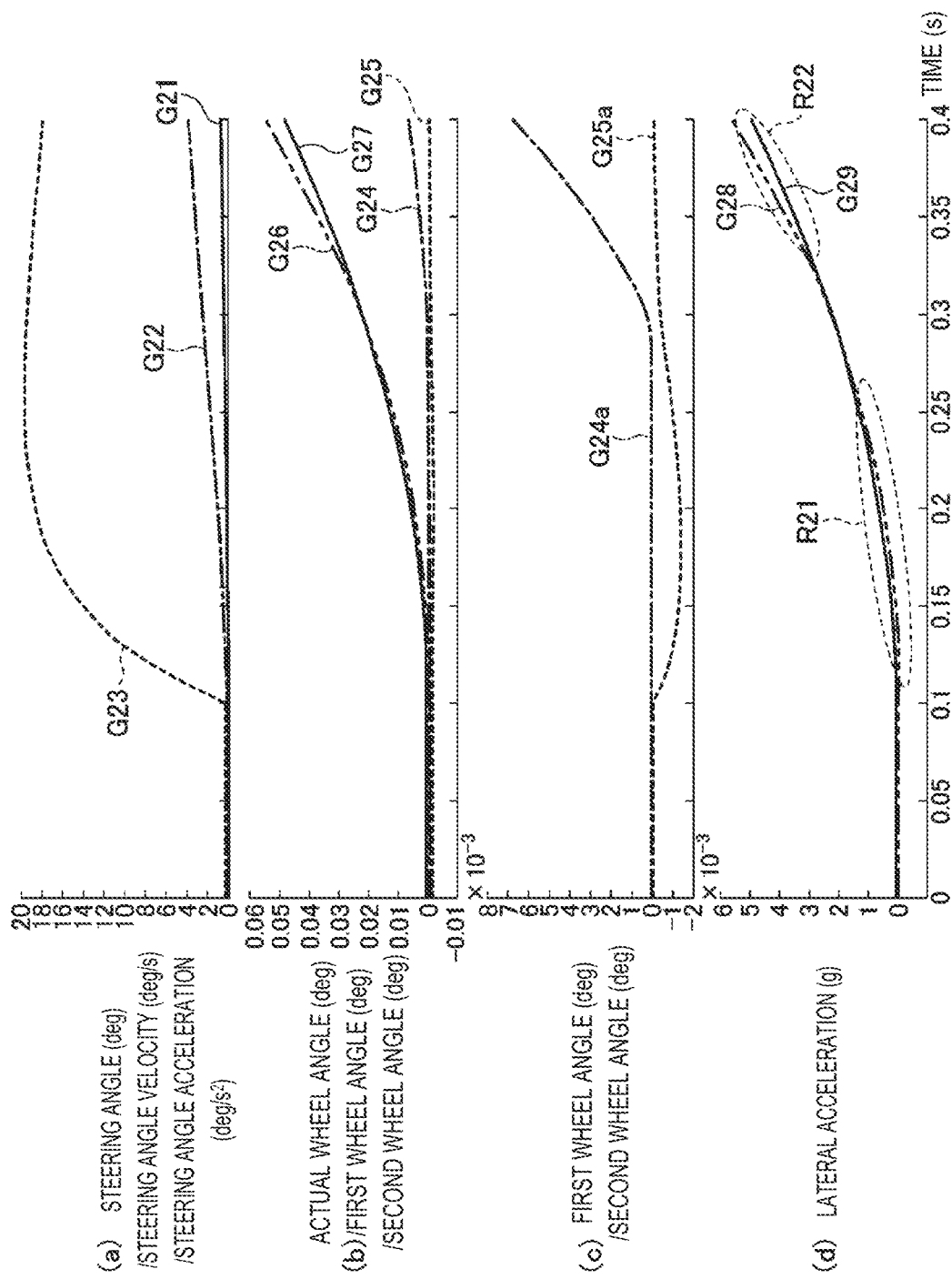
FIG. 9 shows time charts showing FIG. 8 in an enlarged manner.

Next, with reference to FIG. 8 and FIG. 9, the effect of the vehicle motion control according to the first embodiment of the present invention is described. FIG. 8 and FIG. 9 show one example of time charts showing the time change of various parameters obtained when the vehicle motion control according to the first embodiment is executed when the steering wheel 11 is operated to be turned.

In FIG. 8(*a*), a graph G11 shows the steering angle (deg), a graph G12 shows the steering angle velocity (deg/s), and a graph G13 shows the steering angle acceleration (deg/s$^2$). In FIG. 8(*b*), a graph G14 shows the second wheel angle (deg) set based on the steering angle velocity of the graph G12, a graph G15 shows the first wheel angle (deg) set based on the steering angle acceleration of the graph G13, the graph G16 shows the target wheel angle (deg) according to the first embodiment set based on the second wheel angle and the first wheel angle of the graphs G14 and G15 and the wheel angle corresponding to the steering angle of the graph G11, and a graph G17 shows the wheel angle (deg) corresponding to the steering angle of the graph G11 itself. In FIG. 8(*c*), a graph G14*a* shows the second wheel angle (deg) by showing the graph G14 in FIG. 8(*b*) in a manner enlarged in the vertical direction, and a graph G15*a* shows the first wheel angle (deg) by showing the graph G15 in FIG. 8(*b*) in a manner enlarged in the vertical direction. In FIG. 8(*d*), a graph G18 shows the lateral acceleration (g) generated in the vehicle 1 when the target wheel angle of the graph G16 is applied, and a graph G19 shows the lateral acceleration (g) generated in the vehicle 1 when the wheel angle of the graph G17 is applied. In other words, the graph G18 shows the lateral acceleration generated when the vehicle motion control according to the first embodiment is performed, and the graph G19 shows the lateral acceleration generated when the vehicle motion control according to the first embodiment is not performed.

Meanwhile, FIG. 9 shows diagrams obtained by extracting a period (from 0 seconds to 0.4 seconds) denoted by reference numeral A1 in FIG. 8 and enlarging (enlarging mainly in the horizontal direction) only the period. Specifically, in FIG. 9(*a*), a graph G21 shows the steering angle (deg) by showing the graph G11 in an enlarged manner, a graph G22 shows the steering angle velocity (deg/s) by showing the graph G12 in an enlarged manner, and a graph G23 shows the steering angle acceleration (deg/s$^2$) by showing the graph G13 in an enlarged manner. In FIG. 9(b), a graph G24 shows the second wheel angle (deg) by showing the graph G14 in an enlarged manner, a graph G25 shows the first wheel angle (deg) by showing the graph G15 in an enlarged manner, a graph G26 shows the target wheel angle (deg) by showing the graph G16 in an enlarged manner, and a graph G27 shows the wheel angle (deg) corresponding to the steering angle by showing the graph G17 in an enlarged manner. In FIG. 9(c), a graph G24a shows the second wheel angle (deg) by showing the graph G14a in an enlarged manner, and a graph G25a shows the first wheel angle (deg) by showing the graph G15a in an enlarged manner. In FIG. 9(d), a graph G28 shows the lateral acceleration (g) by showing the graph G18 in an enlarged manner, and a graph G29 shows the lateral acceleration (g) by showing the graph G19 in an enlarged manner.

As shown by the graphs G13 and G23, the steering angle acceleration greatly rises immediately after the start of the turning operation of the steering wheel 11. At this time, in the first embodiment, the controller 14 sets the first wheel angle in accordance with the rise of the steering angle acceleration as shown by the graph G25a. Specifically, the controller 14 sets a first wheel angle having a relatively large angle on the returning direction side of the steering wheel 11. Meanwhile, as shown by the graph G22, the steering angle velocity does not rise as much immediately after the start of the turning operation, and hence the controller 14 sets the second wheel angle to almost 0 as shown by the graph G24a. By the first wheel angle and the second wheel angle as above, the target wheel angle (graph G26) to which the first wheel angle and the second wheel angle are applied becomes smaller than the wheel angle (graph G27) corresponding to the steering angle immediately after the start of the turning operation. As a result, according to the first embodiment, as shown by the graph G28, a sudden rise of the lateral acceleration immediately after the start of the turning operation is suppressed. In this case, as indicated by a broken line region R21 in FIG. 9(d), the lateral acceleration (graph G28) obtained when the vehicle motion control according to the first embodiment is performed becomes smaller than the lateral acceleration (graph G29) obtained when the vehicle motion control according to the first embodiment is not performed.

When a certain amount of time elapses from the start of the turning operation, as shown by the graph G24a, the controller 14 increases the second wheel angle in accordance with the rise of the steering angle velocity. Meanwhile, as shown by the graph G25a, the controller 14 reduces the first wheel angle (absolute value) in accordance with the reduction of the steering angle acceleration, more specifically, causes the first wheel angle to approach 0. With the first wheel angle and the second wheel angle as above, when a certain amount of time elapses from the start of the turning operation, the target wheel angle (graph G26) to which the first wheel angle and the second wheel angle are applied becomes larger than the wheel angle (graph G27) corresponding to the steering angle. As a result, as indicated by a broken line region R22 in FIG. 9(d), the lateral acceleration (graph G28) obtained when the vehicle motion control according to the first embodiment is performed becomes larger than the lateral acceleration (graph G29) obtained when the vehicle motion control according to the first embodiment is not performed. Therefore, the responsiveness to the lateral acceleration in accordance with the steering of the driver is secured. In this case, the responsiveness to the yaw rate in accordance with the steering of the driver is also secured.

Figure 10:
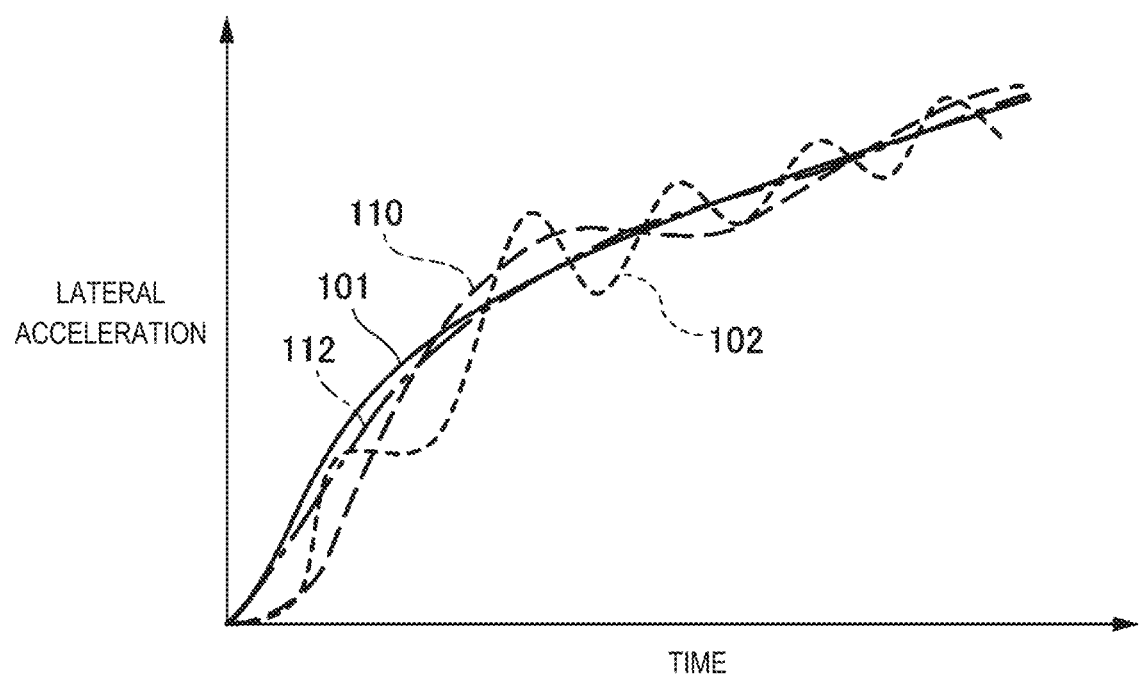
FIG. 10 is a schematic diagram of the lateral acceleration generated when the vehicle motion control according to the first embodiment of the present invention is executed.
Figure 16:
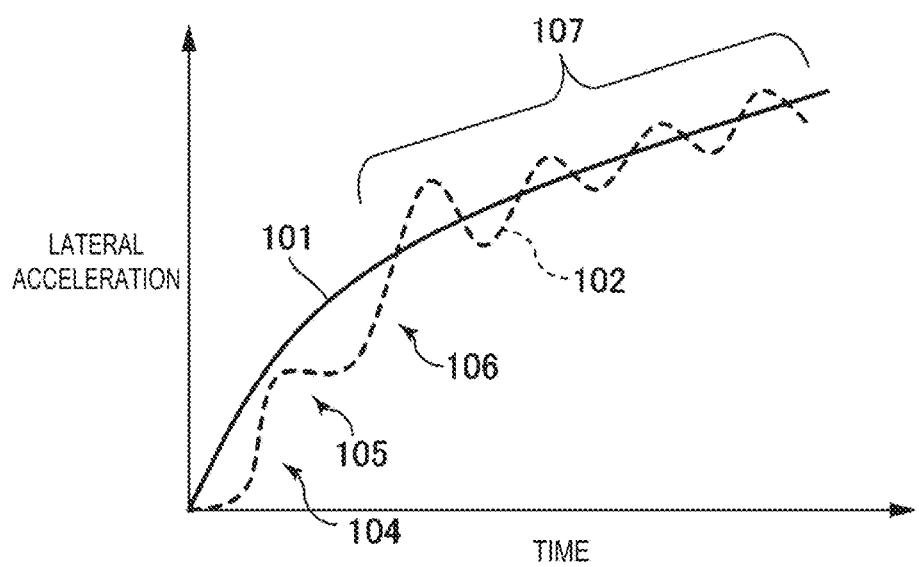
FIG. 16 is an explanatory diagram of the lateral acceleration generated in the vehicle when the steering is operated to be turned.

Next, FIG. 10 is a schematic diagram of the lateral acceleration generated when the vehicle motion control according to the first embodiment is executed when the steering wheel 11 is operated to be turned. In FIG. 10, the horizontal axis indicates time and the vertical axis indicates the lateral acceleration. The elements (in particular, reference numerals 101 and 102) denoted by the same reference numerals as those in FIG. 16 are considered to have the same meaning as those in FIG. 16, and the description thereof is omitted.

In FIG. 10, reference numeral 110 denotes the lateral acceleration (actual lateral acceleration) actually generated in the vehicle 1 when the target wheel angle set only from the first wheel angle (see FIG. 7(a)) in accordance with the steering angle acceleration is applied. According to the actual lateral acceleration 110, it is understood that a sudden rise of the lateral acceleration immediately after the start of the turning operation is suppressed as compared to the actual lateral acceleration 102 for which the vehicle motion control according to this embodiment is not executed. It is understood that the overshoot and the undershoot with respect to the target lateral acceleration 101 are improved in the actual lateral acceleration 110 as compared to the actual lateral acceleration 102 also after the above.

Meanwhile, in FIG. 10, reference numeral 112 denotes the lateral acceleration (actual lateral acceleration) actually generated in the vehicle 1 when the target wheel angle set from both of the first wheel angle (see FIG. 7(a)) in accordance with the steering angle acceleration and the second wheel angle (see FIG. 7(b)) in accordance with the steering angle velocity is applied. According to the actual lateral acceleration 112, it is understood that the rise of the lateral acceleration immediately after the start of the turning operation is allowed by a certain degree, and hence the actual lateral acceleration 112 approaches the target lateral acceleration 101 as compared to the actual lateral acceleration 110 described above. It is understood that the actual lateral acceleration 112 extremely close to the target lateral acceleration 101 can be realized also after the above. Specifically, it is understood that the overshoot and the undershoot with respect to the target lateral acceleration 101 are significantly improved.

As described above, according to the first embodiment, the first wheel angle is set based on the steering angle acceleration and the first wheel angle is applied to the target wheel angle, and hence a sudden rise of the lateral acceleration immediately after the start of the turning operation of the steering wheel 11 can be appropriately suppressed by reducing the wheel angle corresponding to the steering angle based on the steering angle acceleration. As a result, unstable steering due to the change of the lateral acceleration at the time of the turning operation of the steering wheel 11 can be suppressed. In particular, a case where the driver becomes surprised at the sharp lateral acceleration generation immediately after the start of the turning operation and the operation velocity of the steering wheel 11 is reduced (for example, the steering is stopped) can be appropriately suppressed.

According to the first embodiment, the second wheel angle is set based on the steering angle velocity and the second wheel angle is applied to the target wheel angle, and hence the responsiveness (the responsiveness to the yaw rate and the lateral acceleration at the time of turning) of the vehicle 1 with respect to the turning operation of the steering wheel 11 of the driver can be secured by increasing the wheel angle corresponding to the steering angle based on the steering angle velocity. In particular, the degradation of the responsiveness due to the suppression of the lateral acceleration rise by the first wheel angle described above can be suppressed.

According to the first embodiment, when the distance between the driving seat position and the vehicle center-of-gravity position is large, the rise of the lateral acceleration is suppressed more strongly than when the distance is not large. As a result, the suppressing degree of the rise of the lateral acceleration based on the steering angle acceleration can be appropriately changed in accordance with the sensitivity against the lateral acceleration of the driver that changes depending on the distance between the driving seat position and the vehicle center-of-gravity position. According to the first embodiment, the vehicle center-of-gravity position changes based on the sitting state of the occupant in the vehicle cabin, the remaining fuel amount in the fuel tank, and the towing state of the vehicle, and hence an accurate vehicle center-of-gravity position can be applied when the suppressing degree of the rise of the lateral acceleration is changed.

In the first embodiment described above, an example in which the present invention is applied to the steer-by-wire steering apparatus 6 is described, but the present invention can be applied to various steering apparatuses formed so as to be able to change the wheel angle of the front wheels 2 (steered wheels) in a manner independent of the operation of the steering 11 other than the steer-by-wire steering apparatus 6.

The vehicle motion control according to the first embodiment is not limited to being carried out for both of the turning side and the returning side, and it is possible to carry out the vehicle motion control only for the turning side. For example, as shown in FIG. 8(a), the steering angle acceleration becomes less than 0 (in other words, becomes a value on the returning side) when about 1.8 seconds elapses from the start of the turning operation of the steering wheel 11, but the steering angle acceleration on the returning side as above does not necessarily need to be used in the vehicle motion control. Specifically, the first wheel angle only needs to be set to 0 when the steering angle acceleration becomes less than 0. The same applies to the steering angle velocity.

Second Embodiment

Next, vehicle motion control according to the second embodiment of the present invention is described. The description of control and processing similar to those of the first embodiment is omitted, as appropriate, below. Therefore, the control and the processing that are not particularly described here are similar to those of the first embodiment.

In the second embodiment, the controller 14 realizes the control of the lateral acceleration based on the steering angle acceleration and the steering angle velocity by controlling the yaw moment applied to the vehicle 1 instead of controlling the steering apparatus 6 so as to change the wheel angle as in the first embodiment. Specifically, when the steering wheel 11 is operated to be turned, the controller 14 sets a yaw moment (hereinafter referred to as a "first yaw moment") in accordance with the steering angle acceleration, sets a yaw moment (hereinafter referred to as a "second yaw moment") in accordance with the steering angle velocity, and sets a target yaw moment to be applied to the vehicle 1 based on the first yaw moment, and the second yaw moment.

In detail, the controller 14 sets the first yaw moment so as to suppress the turning motion of the vehicle to the direction in accordance with the turning operation of the steering wheel 11, in other words, sets the first yaw moment in the direction opposite from the direction in accordance with the turning operation in order to suppress the rise of the lateral acceleration based on the steering angle acceleration. Meanwhile, the controller 14 sets the second yaw moment so as to advance the turning motion of the vehicle to the direction in accordance with the turning operation of the steering wheel 11, in other words, sets the second yaw moment in the direction in accordance with the turning operation in order to increase the rise of the lateral acceleration based on the steering angle velocity. The controller 14 sets the target yaw moment by adding the first yaw moment (negative value) and the second yaw moment (positive value) together.

The controller 14 realizes the target yaw moment set as described above by controlling the braking force applied to the vehicle 1 (the braking force by the brake apparatuses 19). The controller 14 typically controls the brake apparatuses 19 via the brake control system 20 so as to increase the braking force applied to a turning outer wheel of the vehicle 1 based on the steering angle acceleration when the target yaw moment in the direction opposite from the turning direction in accordance with the turning operation of the steering wheel 11 is realized (in other words, when the rise of the lateral acceleration is to be suppressed based on the steering angle acceleration). Meanwhile, the controller 14 controls the brake apparatuses 19 via the brake control system 20 so as to increase the braking force applied to a turning inner wheel of the vehicle 1 based on the steering angle velocity when the target yaw moment in the turning direction in accordance with the turning operation of the steering wheel 11 is realized (in other words, when the rise of the lateral acceleration is to be increased based on the steering angle velocity).

Figure 11:
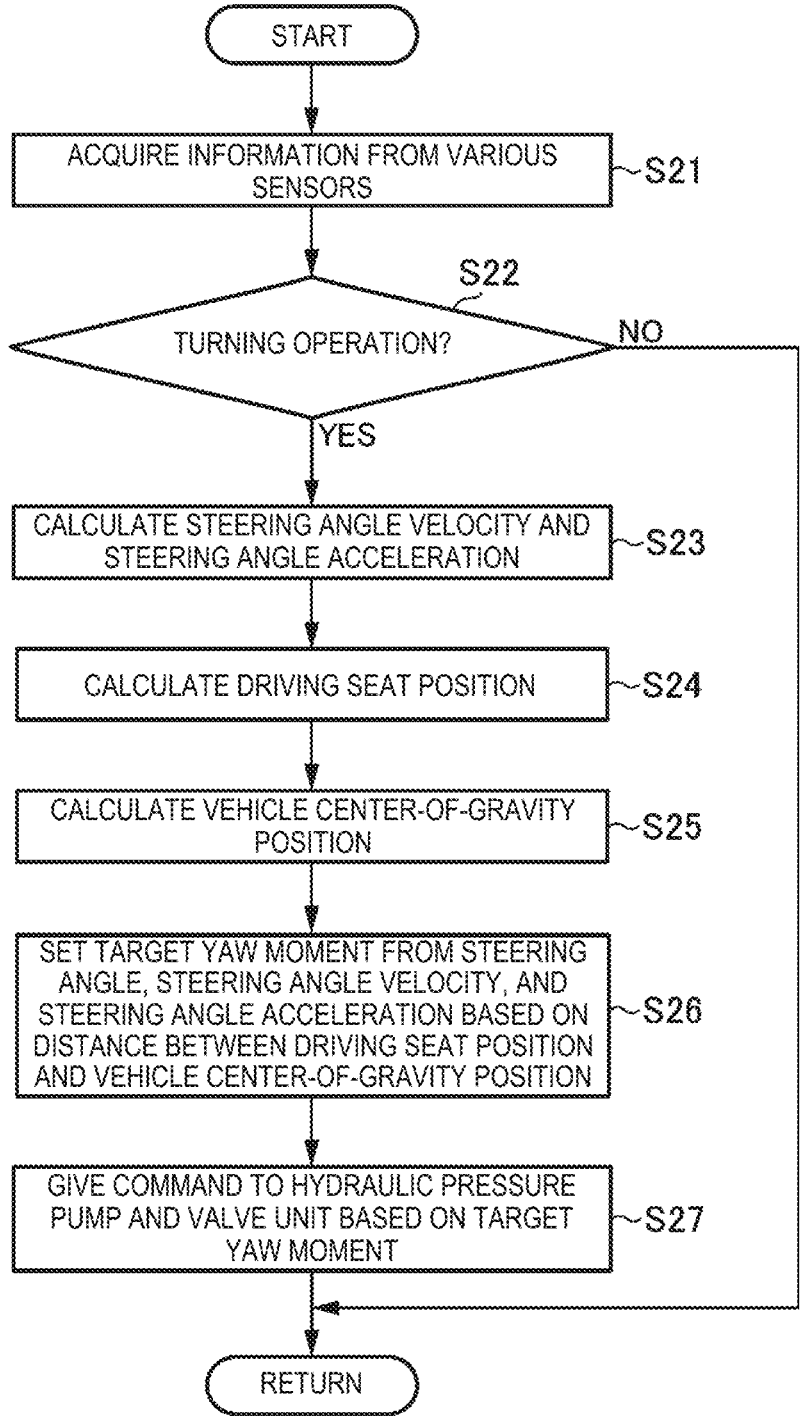
FIG. 11 is a flowchart of vehicle motion control processing according to a second embodiment of the present invention.
Figure 12:
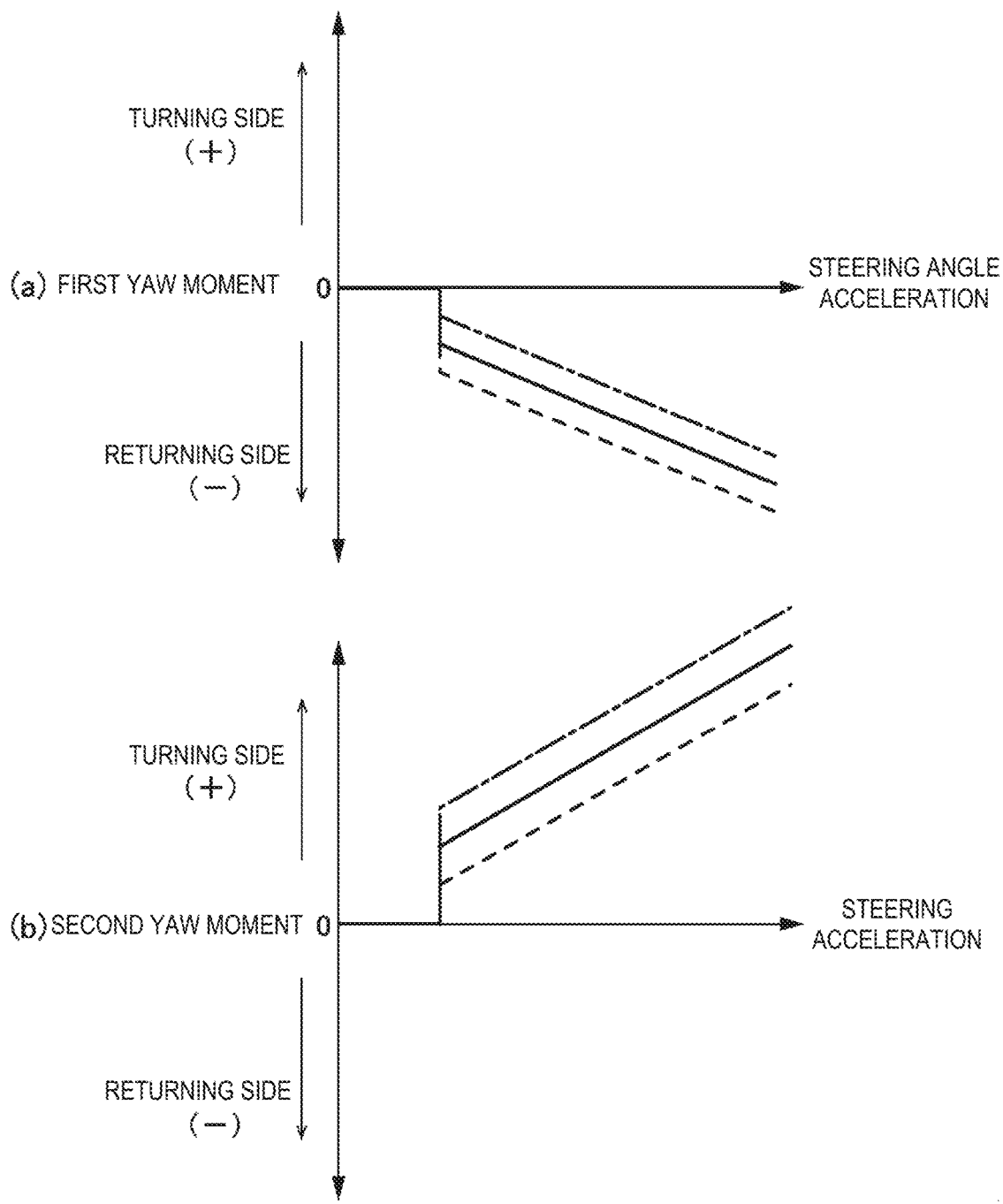
FIG. 12 shows maps of a first yaw moment and a second yaw moment according to the second embodiment of the present invention.

Next, with reference to FIG. 11 and FIG. 12, the vehicle motion control according to the second embodiment of the present invention is specifically described. FIG. 11 is a flowchart of the vehicle motion control processing according to the second embodiment of the present invention, and FIG. 12 shows maps of the first yaw moment and the second yaw moment according to the second embodiment of the present invention.

In the vehicle motion control processing in FIG. 11, processing from Step S21 to Step S25 are similar to the processing from Step S11 to Step S15 in the vehicle motion control processing in FIG. 6, and hence the description thereof is omitted. Processing in Step S26 and steps thereafter are described here.

In Step S26, the controller 14 sets the target yaw moment to be applied to the vehicle 1 based on the steering angle acquired in Step S21 and the steering angle velocity and the steering angle acceleration acquired in Step S23. Specifically, the controller 14 sets the first yaw moment based on the steering angle acceleration, sets the second yaw moment based on the steering angle velocity, and sets the target yaw moment based on the first yaw moment and the second yaw moment. In this case, the controller 14 corrects the first yaw moment in accordance with the steering angle acceleration and corrects the second yaw moment in accordance with the steering angle velocity based on the distance between the driving seat position acquired in Step S24 and the vehicle center-of-gravity position acquired in Step S25, and sets the target yaw moment from the first yaw moment and the second yaw moment corrected as above.

In detail, the controller 14 sets the first yaw moment based on the steering angle acceleration and sets the second yaw moment based on the steering angle velocity with use of the maps in FIG. 12. The solid line in FIG. 12(*a*) indicates a map defining the first yaw moment (vertical axis) to be set in accordance with the steering angle acceleration (horizontal axis). The map is defined such that the first yaw moment increases on the side (returning side) in the direction opposite from the direction in accordance with the turning operation of the steering wheel 11 as the steering angle acceleration increases when the steering angle acceleration is equal to or more than a predetermined value (the first yaw moment is 0 when the steering angle acceleration is less than the predetermined value). By doing so, in particular, a sudden rise of the lateral acceleration in accordance with the rise of the steering angle acceleration immediately after the start of the turning operation of the steering wheel 11 is suppressed.

The controller 14 corrects the first yaw moment set based on the steering angle acceleration as above based on the distance between the driving seat position and the vehicle center-of-gravity position. Specifically, the controller 14 corrects the first yaw moment to the yaw moment, on the returning side (see the broken line in FIG. 12(*a*)) when the distance between the driving seat position and the vehicle center-of-gravity position is large. When the distance is large, the driver easily feels the lateral acceleration, and hence the suppressing degree of the rise of the lateral acceleration based on the steering angle acceleration is increased by correcting the first yaw moment to the returning side. Meanwhile, the controller 14 corrects the first yaw moment to the yaw moment on the turning side (see the long dashed short dashed line in FIG. 12(*a*)) when the distance between the driving seat position and the vehicle center-of-gravity position is small. When the distance is small, the driver feels the lateral acceleration less easily, and hence the suppressing degree of the rise of the lateral acceleration based on the steering angle acceleration is reduced by correcting the first yaw moment to the turning side.

Meanwhile, the solid line in FIG. 12(*b*) indicates a map defining the second yaw moment (vertical axis) to be set in accordance with the steering angle velocity (horizontal axis). The map is defined such that, when the steering angle velocity is equal to or more than a predetermined value (the second yaw moment is 0 when the steering angle velocity is less than the predetermined value), the second yaw moment increases on the side (turning side) in the direction in accordance with the turning operation of the steering wheel 11 as the steering angle velocity increases. By doing so, the responsiveness (the responsiveness to the yaw rate and the lateral acceleration at the time of turning) of the vehicle 1 with respect to the turning operation of the driver is secured. In other words, the degradation of the responsiveness due to the suppression of the lateral acceleration rise based on the steering angle acceleration as described above (in particular, excessive suppression of the lateral acceleration rise) is suppressed.

The controller 14 corrects the second yaw moment set based on the steering angle velocity as above based on the distance between the driving seat position and the vehicle center-of-gravity position. Specifically, the controller 14 corrects the second yaw moment to the yaw moment on the returning side (see the broken line in FIG. 12(*b*)) when the distance between the driving seat position and the vehicle center-of-gravity position is large. The reason why the second yaw moment is corrected to the returning side is that the degradation of the responsiveness relating to the lateral acceleration as described above does not easily occur because the driver easily feels the lateral acceleration when the distance is large. Meanwhile, the controller 14 corrects the second yaw moment to the yaw moment on the turning side (see the long dashed short dashed line in FIG. 12(*b*)) when the distance between the driving seat position and the vehicle center-of-gravity position is small. The reason why the second yaw moment is corrected to the turning side is that the degradation of the responsiveness relating to the lateral acceleration as described above easily occurs because the driver feels the lateral acceleration less easily when the distance is small.

The change rate (absolute value) of the first yaw moment in accordance with the steering angle acceleration in the map in FIG. 12(*a*) is preferred to be smaller than the change rate (absolute value) of the second yaw moment in accordance with the steering angle velocity in the map in FIG. 12(*b*). This is in order to prevent a case where the suppression of the lateral acceleration rise based on the steering angle acceleration becomes excessive and discomfort is given to the driver.

The first yaw moment and the second yaw moment are not limited to being linearly changed in accordance with the steering angle acceleration and the steering angle velocity. For example, the first yaw moment and the second yaw moment may be quadratically or exponentially changed in accordance with the steering angle acceleration and the steering angle velocity.

Returning back to FIG. 11, in Step S26, the controller 14 sets the target yaw moment applied to the vehicle 1 by adding the first yaw moment (negative value) and the second yaw moment (positive value) set as described above. When the first yaw moment is larger than the second yaw moment as absolute values, the target yaw moment on the side (returning side) in the direction opposite from the direction in accordance with the turning operation is set. Meanwhile, when the first yaw moment is smaller than the second yaw moment as absolute values, the target yaw moment on the side (turning side) in the direction in accordance with the turning operation is set.

Next, in Step S27, the controller 14 controls the brake apparatuses 19 via the brake control system 20 so as to apply the target yaw moment set in Step S26 to the vehicle 1. The controller 14 typically controls the brake apparatuses 19 so as to apply the braking force to the turning outer wheel of the vehicle 1 when the target yaw moment is a negative value (in other words, the direction of the moment is on a side (returning side) in the direction opposite from the direction in accordance with the turning operation). Meanwhile, when the target yaw moment is a positive value (in other words, the direction of the moment is on a side (turning side) in the direction in accordance with the turning operation), the controller 14 controls the brake apparatuses 19 so as to apply the braking force to the turning inner wheel of the vehicle 1.

More specifically, the controller 14 stores a map defining the relationship between the yaw moment command value and the rotating speed of the hydraulic pressure pump 21 in advance and operates the hydraulic pressure pump 21 at a rotating speed corresponding to the target yaw moment set in Step S26 (for example, raises the rotating speed of the hydraulic pressure pump 21 to a rotating speed corresponding to the braking force command value by raising the electric power supplied to the hydraulic pressure pump 21) with reference to the map. The controller 14 stores, for example, a map defining the relationship between the yaw moment command value and the opening of the valve units 22 in advance, individually controls the valve units 22 so as to obtain an opening corresponding to the target yaw moment (for example, increases the opening of the solenoid valves to an opening corresponding to the braking force command value by raising the electric power supplied to the solenoid valve) with reference to the map, and adjusts the braking force of each of the wheels. After Step S27 above, the controller 14 ends the vehicle motion control processing.

Figure 13:
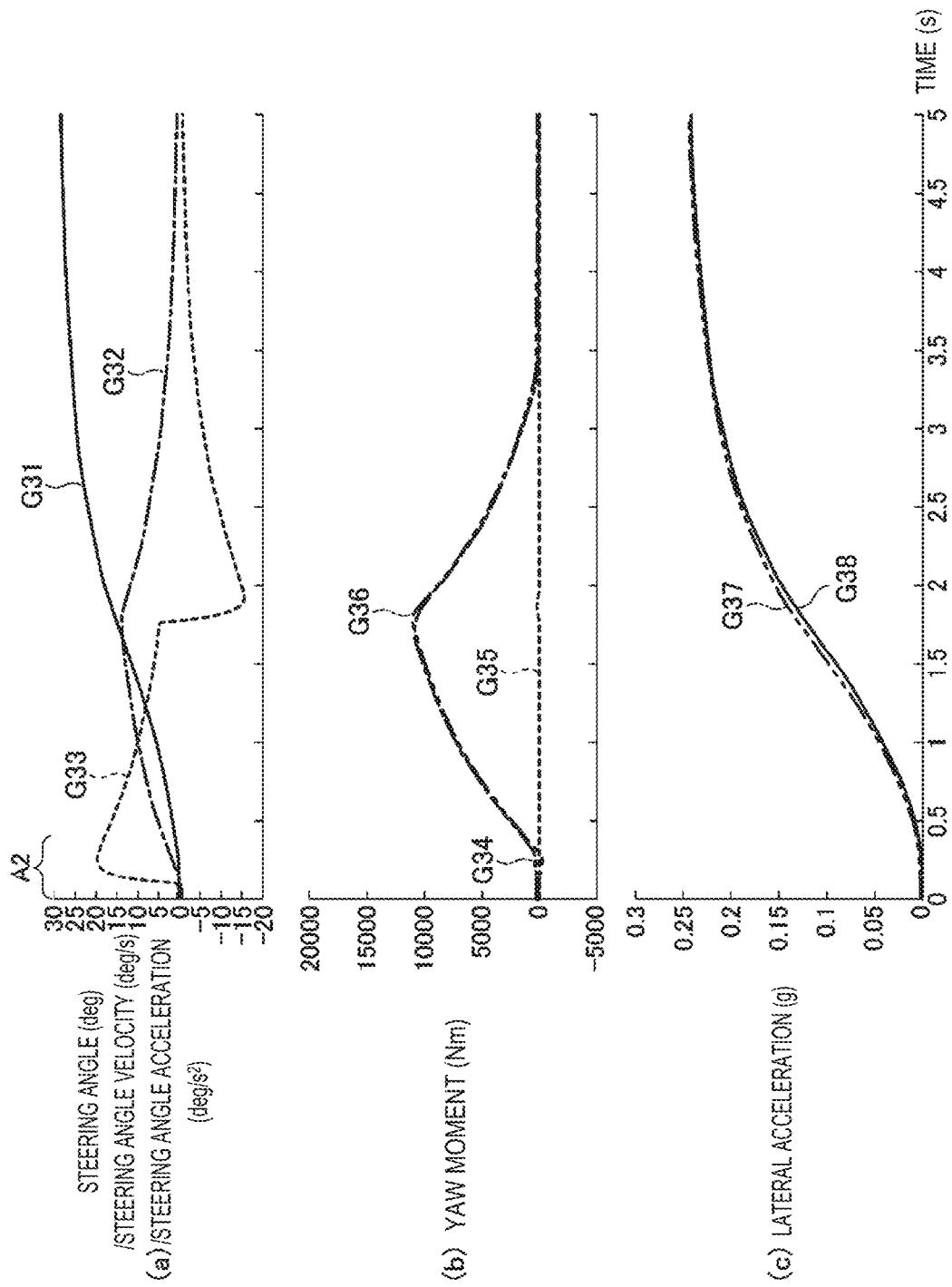
FIG. 13 shows time charts showing the time change of various parameters obtained when vehicle motion control according to the second embodiment of the present invention is executed.
Figure 14:
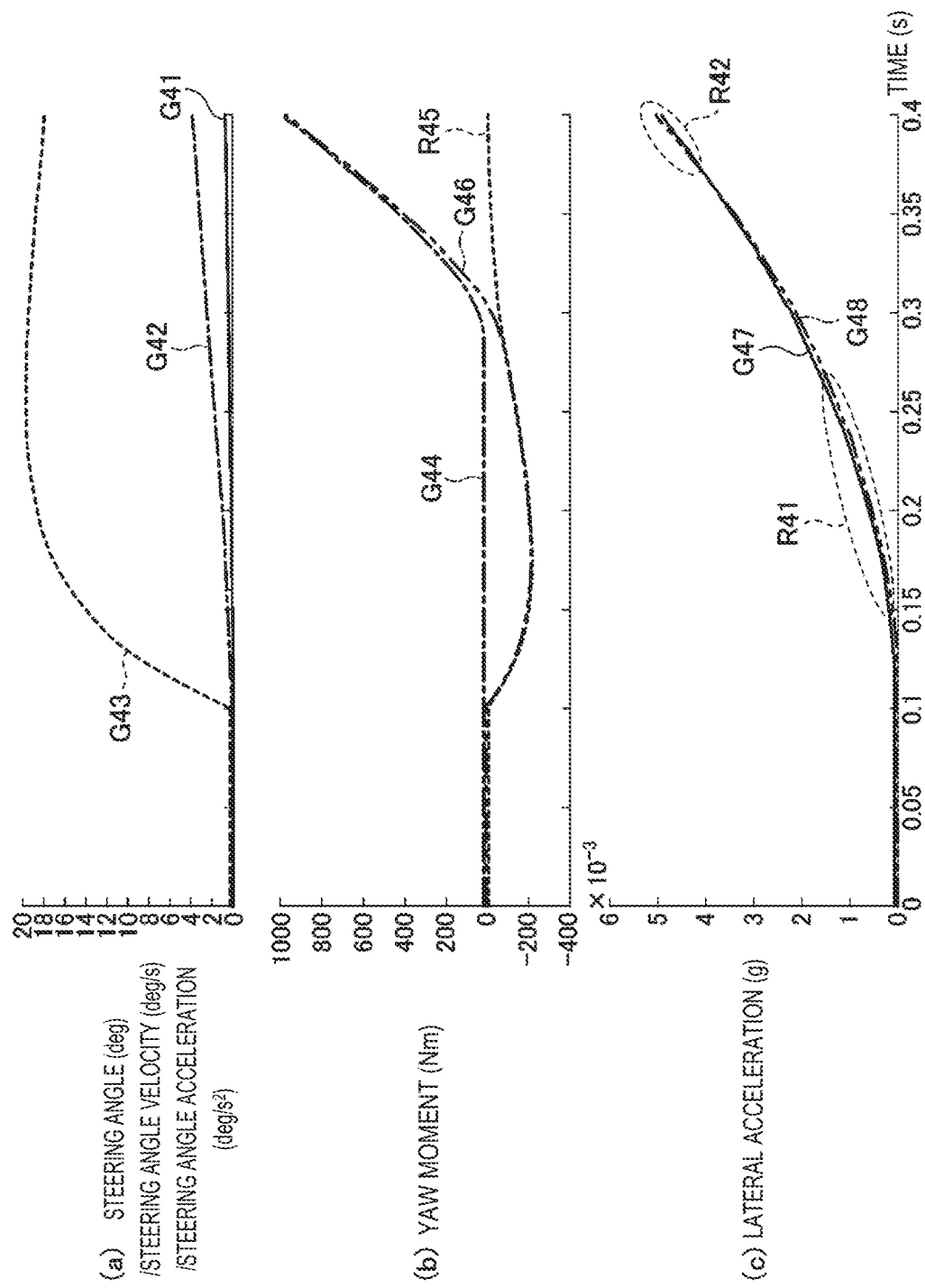
FIG. 14 shows time charts showing FIG. 13 in an enlarged manner.

Next, with reference to FIG. 13 and FIG. 14, the effect of the vehicle motion control according to the second embodiment of the present invention is described. FIG. 13 and FIG. 14 show one example of time charts showing the time change of various parameters obtained when the vehicle motion control according to the second embodiment is executed when the steering wheel 11 is operated to be turned.

In FIG. 13(a), a graph G31 shows the steering angle (deg), a graph G32 shows the steering angle velocity (deg/s), and a graph G33 shows the steering angle acceleration (deg/s²). In FIG. 13(b), a graph G34 shows the second yaw moment (Nm) set based on the steering angle velocity of the graph G32, a graph G35 shows the first yaw moment (Nm) set based on the steering angle acceleration of the graph G33, and a graph G36 shows the target yaw moment (Nm) according to the second embodiment set based on the second yaw moment and the first yaw moment of the graphs G34 and G35. In FIG. 13(c), a graph G37 shows the lateral acceleration (g) generated in the vehicle 1 when the target yaw moment of the graph G36 is applied, in other words, shows the lateral acceleration generated when the vehicle motion control according to the second embodiment is performed, and a graph G38 shows the lateral acceleration generated when the vehicle motion control according to the second embodiment is not performed.

Meanwhile, FIG. 14 shows diagrams shown by extracting a period (from 0 seconds to 0.4 seconds) denoted by reference numeral A2 in FIG. 13 and enlarging (mainly enlarging in the horizontal direction) only the period. Specifically, in FIG. 14(a), a graph G41 shows the steering angle (deg) by showing the graph G31 in an enlarged manner, a graph G42 shows the steering angle velocity (deg/s) by showing the graph G32 in an enlarged manner, and a graph G43 shows the steering angle acceleration (deg/s²) by showing the graph G33 in an enlarged manner. In FIG. 14(b), a graph G44 shows the second yaw moment (Nm) by showing the graph G34 in an enlarged manner, a graph G45 shows the first yaw moment (Nm) by showing the graph G35 in an enlarged manner, and a graph G46 shows the target yaw moment (Nm) by showing the graph G36 in an enlarged manner. In FIG. 14(c), a graph G47 shows the lateral acceleration (g) by showing the graph G37 in an enlarged manner, and a graph G48 shows the lateral acceleration (g) by showing the graph G38 in an enlarged manner.

As shown by the graphs G33 and G43, the steering angle acceleration greatly rises immediately after the start of the turning operation of the steering wheel 11. At this time, in the second embodiment, as shown by the graph G45, the controller 14 sets the first yaw moment in accordance with the rise of the steering angle acceleration. Specifically, the controller 14 sets the first yaw moment having a relatively large value on the returning direction side of the steering wheel 11. Meanwhile, as shown by the graph G42, the steering angle velocity does not rise as much immediately after the start of the turning operation, and hence the controller 14 sets the second yaw moment to almost 0 as shown by the graph G44. By the first yaw moment and the second yaw moment as above, the first yaw moment is set to the target yaw moment, in an unchanged manner immediately after the start of the turning operation (graph G46). As a result, according to the second embodiment, as shown by the graph G47, a sudden rise of the lateral acceleration immediately after the start of the turning operation is suppressed. In this case, as indicated by a broken line region R41 in FIG. 14(c), the lateral acceleration (graph G47) obtained when the vehicle motion control according to the second embodiment is performed is smaller than the lateral acceleration (graph G48) obtained when the vehicle motion control according to the second embodiment is not performed.

When a certain amount of time elapses from the start of the turning operation, as shown by the graph G44, the controller 14 increases the second yaw moment in accordance with the rise of the steering angle velocity. Meanwhile, as shown by the graph G45, the controller 14 reduces the first yaw moment (absolute value) in accordance with the reduction of the steering angle acceleration, more specifically, causes the first yaw moment to approach 0. By the first yaw moment and the second yaw moment as above, the target yaw moment increases in accordance with the second yaw moment (graph G46) when a certain amount of time elapses from the start of the turning operation. As a result, as indicated by a broken line region R42 in FIG. 14(c), the lateral acceleration (graph G47) obtained when the vehicle motion control according to the second embodiment is performed becomes larger than the lateral acceleration (graph G48) obtained when the vehicle motion control according to the second embodiment is not performed. Therefore, the responsiveness of the lateral acceleration in accordance with the steering of the driver is secured. In this case, the responsiveness to the yaw rate in accordance with the steering of the driver is also secured.

As described above, according to the second embodiment, the first yaw moment is set based on the steering angle acceleration and the first yaw moment is applied to the target yaw moment. Therefore, a sudden rise of the lateral acceleration immediately after the start of the turning operation can be appropriately suppressed by increasing the yaw moment applied to the side (returning side) in the direction opposite from the direction in accordance with the turning operation of the steering wheel 11 based on the steering angle acceleration. As a result, unstable steering due to the change of the lateral acceleration at the time of the turning operation of the steering wheel 11 can be suppressed. In particular, a case where the driver becomes surprised at the sharp lateral acceleration generation immediately after the start of the turning operation and the operation velocity of the steering wheel 11 is reduced (for example, the steering is stopped) can be appropriately suppressed.

According to the second embodiment, the second yaw moment is set based on the steering angle velocity and the second yaw moment is applied to the target yaw moment. Therefore, the responsiveness (the responsiveness to the yaw rate and the lateral acceleration at the time of turning) of the vehicle 1 with respect to the turning operation of the driver can be secured by increasing the yaw moment applied to the side (turning side) in the direction in accordance with the turning operation of the steering wheel 11 based on the steering angle velocity. In particular, the degradation of the responsiveness due to the suppression of the lateral acceleration rise caused by the first yaw moment described above can be suppressed.

A modification of the second embodiment is described below.

The vehicle motion control according to the second embodiment described above is not limited to being carried out for both of the turning side and the returning side, and it is possible to carry out the vehicle motion control only for the turning side. For example, as illustrated in FIG. 13(a), when about 1.8 seconds elapses from the start of the turning operation of the steering wheel 11, the steering angle acceleration becomes less than 0 (in other words, becomes a value on the returning side), but the steering angle acceleration on the returning side as above does not need to be used in the vehicle motion control. Specifically, when the steering angle acceleration becomes less than 0, the first yaw moment only needs to be set to 0. The same applies to the steering angle velocity.

In the second embodiment described above, the target yaw moment is set based on the steering angle acceleration and the steering angle velocity, and the braking force applied to the vehicle 1 is controlled so as to realize the target yaw moment. However, in another example, the braking force may be controlled by directly setting the braking force to be applied to the vehicle 1 based on the steering angle acceleration and the steering angle velocity without setting the target yaw moment. In this example, the braking force to be applied to the turning outer wheel of the vehicle only needs to be set based on the steering angle acceleration, and the braking force to be applied to the turning inner wheel of the vehicle 1 only needs to be set based on the steering angle velocity. In other words, the yaw moment in the direction opposite from the turning direction in accordance with the turning operation only needs to be added by applying the braking force to the turning outer wheel of the vehicle 1 based on the steering angle acceleration, and the yaw moment in the turning direction in accordance with the turning operation only needs to be added by applying the braking force to the turning inner wheel of the vehicle 1 based on the steering angle velocity.

Figure 15:
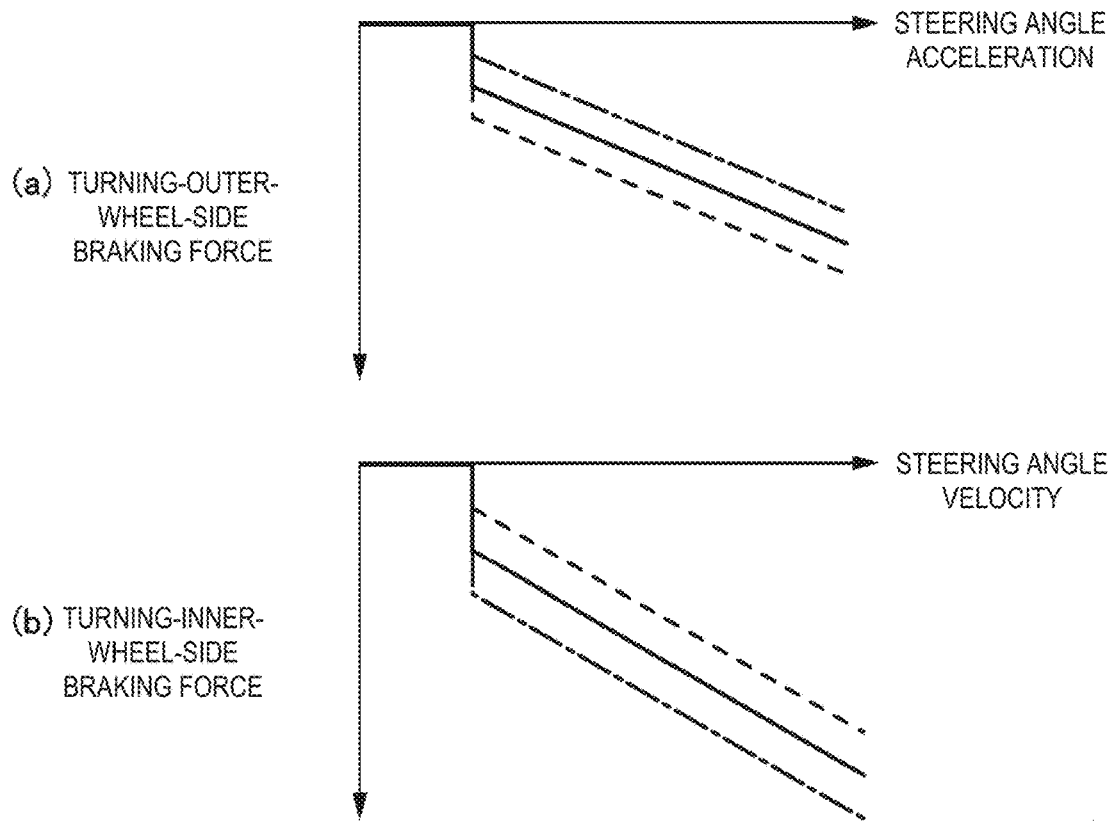
FIG. 15 shows maps of the braking force according to a modification of the second embodiment of the present invention.

FIG. 15 shows maps of the braking force according to the modification of the second embodiment of the present invention. The solid line in FIG. 15(a) indicates a map defining a turning-outer-wheel-side braking force (vertical axis) to be set in accordance with the steering angle acceleration (horizontal axis), in other words, the braking force to be applied to the turning outer wheel of the vehicle 1. The map is defined such that, when the steering angle acceleration as equal to or more than a predetermined value (the turning-outer-wheel-side braking force is 0 when the steering angle acceleration is less than the predetermined value), the turning-outer-wheel-side braking force (absolute value) increases as the steering angle acceleration increases. By doing so, in particular, a sudden rise of the lateral acceleration in accordance with the rise of the steering angle acceleration immediately after the start of the turning operation of the steering wheel 11 is suppressed. The controller 14 corrects the turning-outer-wheel-side braking force in accordance with the steering angle acceleration as above based on the distance between the driving seat position and the vehicle center-of-gravity position. Specifically, the controller 14 performs correction that increases the turning-outer-wheel-side braking force (absolute value) (see the broken line in FIG. 15(a)) when the distance between the driving seat position and the vehicle center-of-gravity position is large. Meanwhile, the controller 14 performs correction that reduces the turning-outer-wheel-side braking force (absolute value) (see the long dashed short dashed line in FIG. 15(a)) when the distance between the driving seat position and the vehicle center-of-gravity position is small.

Meanwhile, the solid line in FIG. 15(b) indicates a map defining a turning-inner-wheel-side braking force (vertical axis) to be set in accordance with the steering angle velocity (horizontal axis), in other words, the braking force to be applied to the turning inner wheel of the vehicle 1. The map is defined such that, when the steering angle velocity is equal to or more than a predetermined value (the turning-inner-wheel-side braking force is 0 when the steering angle velocity is less than the predetermined value), the turning-inner-wheel-side braking force (absolute value) increases as the steering angle velocity increases. By doing so, the responsiveness (the responsiveness to the yaw rate and the lateral acceleration at the time of turning) of the vehicle 1 with respect to the turning operation of the driver is secured. In other words, the degradation of the responsiveness due to the suppression of the lateral acceleration rise based on the steering angle acceleration as described above (in particular, excessive suppression of the lateral acceleration rise) is suppressed. The controller 14 corrects the turning-inner-wheel-side braking force in accordance with the steering angle velocity as above based on the distance between the driving seat position and the vehicle center-of-gravity position. Specifically, the controller 14 performs correction that reduces the turning-inner-wheel-side braking force (absolute value) when the distance between the driving seat position and the vehicle center-of-gravity position is large (see the broken line FIG. 15(b)). Meanwhile, the controller 14 performs correction that increases the turning-inner-wheel-side braking force (absolute value) when the distance between the driving seat position and the vehicle center-of-gravity position is small (see the long dashed short dashed line in FIG. 15(b)).

In the second embodiment described above, the braking force is applied to the vehicle 1 by the brake apparatuses 19 in order to realize the target yaw moment. However, in another example, the target yaw moment may be realized by applying the braking force to the vehicle 1 by regenerative power generation by the motor generator 4 instead of applying the braking force by the brake apparatuses 19 or in addition to applying the braking force by the brake apparatuses 19. In this case, the braking force applied to each wheel by regenerative power generation of the motor generator 4 only needs to be changed.

In the second embodiment described above, the target yaw moment is realized by controlling the braking force applied to the vehicle 1. However, in another example, the target yaw moment may be realized by controlling the driving force applied to the vehicle 1 instead of controlling the braking force or in addition to controlling the braking force. In one example, the target yaw moment may be realized by changing the driving forces applied to left and right wheels. In another example, the target yaw moment may be realized by applying the driving force to one of the left and right wheels and applying the braking force to the other of the left and right wheels. In this example, the driving force only needs to be applied to the turning inner wheel while applying the braking force to the turning outer wheel when the yaw moment in the direction opposite from the turning direction in accordance with the turning operation is added to the vehicle 1, and the braking force only needs to be applied to the turning inner wheel while applying the driving force to the turning outer wheel when the yaw moment in the turning direction in accordance with the turning operation is added to the vehicle 1.

The second embodiment described above may be carried out in combination with the first embodiment. In other words, both of the control of the steering apparatus 6 for changing the wheel angle and the control (the control of the braking force and the driving force applied to the vehicle 1) of the yaw moment applied to the vehicle 1 can be carried out in order to control the lateral acceleration of the vehicle 1 based on the steering angle acceleration and the steering angle velocity.

REFERENCE SIGNS LIST

1 Vehicle
2 Front wheel
3 Inverter
4 Motor generator
6 Steering apparatus
8 Steering angle sensor
11 Steering wheel
14 Controller
16 Electromagnetic steering motor
19 Brake apparatus
20 Brake control system

The invention claimed is:

1. A control apparatus of a vehicle, the control apparatus being characterized by comprising:
a steering apparatus including a steering wheel operated in order to turn the vehicle and a steering angle sensor that detects a steering angle of the steering wheel, the steering apparatus steering a steered wheel of the vehicle in accordance with operation of the steering wheel;
a controller configured to set a steering angle acceleration based on the steering angle detected by the steering angle sensor, and control vehicle motion when the steering wheel is operated to be turned, wherein
the controller is configured to control the vehicle motion so as to suppress a rise of lateral acceleration of the vehicle based on the steering angle acceleration,
wherein the controller is configured to suppress the rise of the lateral acceleration of the vehicle based on the steering angle acceleration by controlling a yaw moment of the vehicle based on the steering angle acceleration,
wherein the control apparatus of the vehicle further comprises a brake apparatus capable of applying different braking forces to left and right wheels, wherein the controller is configured to:
set a steering angle velocity based on the steering angle detected by the steering angle sensor; and
control the yaw moment by controlling the brake apparatus so as to increase a braking force applied to a turning outer wheel of the vehicle based on the steering angle acceleration and controlling the brake apparatus so as to increase a braking force applied to a turning inner wheel of the vehicle based on the steering angle velocity.

2. The control apparatus of the vehicle according to claim 1, wherein the controller is configured to:
further set a steering angle velocity based on the steering angle detected by the steering angle sensor; and
increase the rise of the lateral acceleration of the vehicle based on the steering angle velocity while suppressing the rise of the lateral acceleration of the vehicle based on the steering angle acceleration.

3. The control apparatus of the vehicle according to claim 2, wherein
the controller is configured to further set a steering angle velocity based on the steering angle detected by the steering angle sensor;
the steering apparatus is formed to be able to change a wheel angle of the steered wheel in a manner independent of the operation of the steering; and
the controller is configured to suppress the rise of the lateral acceleration of the vehicle based on the steering angle acceleration by controlling the steering apparatus to change the wheel angle based on the steering angle, the steering angle velocity, and the steering angle acceleration, such that the change of the wheel angle is not structurally or mechanically dependent on the operation of the steering wheel.

4. The control apparatus of the vehicle according to claim 3, wherein the controller is configured to suppress the rise of the lateral acceleration of the vehicle based on the steering angle acceleration by controlling a yaw moment of the vehicle based on the steering angle acceleration.

5. The control apparatus of the vehicle according to claim 4, wherein the controller is configured to control the yaw moment by controlling at least one of a braking force and a driving force applied to the vehicle.

6. The control apparatus of the vehicle according to claim 1, wherein
the controller is configured to further set a steering angle velocity based on the steering angle detected by the steering angle sensor;
the steering apparatus is formed to be able to change a wheel angle of the steered wheel in a manner independent of the operation of the steering wheel; and
the controller is configured to suppress the rise of the lateral acceleration of the vehicle based on the steering angle acceleration by controlling the steering apparatus to change the wheel angle based on the steering angle, the steering angle velocity, and the steering angle acceleration, such that the change of the wheel angle is not structurally or mechanically dependent on the operation of the steering wheel.

7. The control apparatus of the vehicle according to claim 1, wherein the controller is configured to control the yaw moment by controlling at least one of a braking force and a driving force applied to the vehicle.

8. A control apparatus of a vehicle, the control apparatus being characterized by comprising:
a steering apparatus including a steering wheel operated in order to turn the vehicle and a steering angle sensor that detects a steering angle of the steering wheel, the steering apparatus steering a steered wheel of the vehicle in accordance with operation of the steering wheel;
a controller configured to set a steering angle acceleration based on the steering angle detected by the steering angle sensor, and control vehicle motion when the steering wheel is operated to be turned, wherein
the controller is configured to control the vehicle motion so as to suppress a rise of lateral acceleration of the vehicle based on the steering angle acceleration, wherein
the vehicle includes a driving seat of which position is adjustable in a vehicle front-rear direction;
a vehicle front-rear position of the driving seat is set to be ahead of a center-of-gravity position of the vehicle in the vehicle front-rear direction; and
the controller is configured to suppress the rise of the lateral acceleration of the vehicle more strongly as a distance between the vehicle front-rear position of the driving seat and the center-of-gravity position of the vehicle increases.

9. The control apparatus of the vehicle according to claim 8, further comprising a sitting sensor that detects a sitting state other than a sitting state of the driving seat, wherein the controller is configured to change the center-of-gravity position of the vehicle based on the sitting state detected by the sitting sensor.

10. The control apparatus of the vehicle according to claim 9, wherein the sitting sensor detects sitting states of a passenger seat and a rear seat of the vehicle.

11. The control apparatus of the vehicle according to claim 8, further comprising a remaining fuel amount sensor that detects a remaining fuel amount in a fuel tank of the vehicle, wherein the controller is configured to change the center-of-gravity position of the vehicle based on the remaining fuel amount detected by the remaining fuel amount sensor.

12. The control apparatus of the vehicle according to claim 8, wherein the controller is configured to determine whether the vehicle is in a towing state, and change the center-of-gravity position of the vehicle based on a determination result of the towing state.

13. A control apparatus of a vehicle, the control apparatus being characterized by comprising:
a steering apparatus including a steering wheel operated in order to turn the vehicle and a steering angle sensor that detects a steering angle of the steering wheel, the steering apparatus steering a steered wheel of the vehicle in accordance with operation of the steering wheel;
a controller configured to set a steering angle acceleration based on the steering angle detected by the steering angle sensor, and control vehicle motion when the steering wheel is operated to be turned, wherein
the controller is configured to control the vehicle motion so as to suppress a rise of lateral acceleration of the vehicle based on the steering angle acceleration, wherein
the vehicle includes a driving seat of which position is adjustable in a vehicle front-rear direction; and
the controller is configured to suppress the rise of the lateral acceleration of the vehicle more strongly when a vehicle front-rear position of the driving seat is at a front position than when the vehicle front-rear position of the driving seat is not at the front position.

14. A control apparatus of a vehicle, the control apparatus being characterized by comprising:
a steering apparatus including a steering wheel operated in order to turn the vehicle and a steering angle sensor that detects a steering angle of the steering wheel, the steering apparatus steering a steered wheel in accordance with operation of the steering wheel;
a controller configured to set a steering angle acceleration based on the steering angle detected by the steering angle sensor, and control vehicle motion when the steering wheel is operated to be turned, wherein
the controller is configured to suppress a rise of lateral acceleration of the vehicle based on the steering angle acceleration in order to control the vehicle motion so as to suppress reduction of an operation velocity of the steering wheel caused by a driver due to the lateral acceleration of the vehicle that rises in accordance with the turning operation of the steering wheel,
wherein
the vehicle includes a driving seat of which position is adjustable in a vehicle front-rear direction;
a vehicle front-rear position of the driving seat is set to be ahead of a center-of-gravity position of the vehicle in the vehicle front-rear direction; and
the controller is configured to suppress the rise of the lateral acceleration of the vehicle more strongly as a distance between the vehicle front-rear position of the driving seat and the center-of-gravity position of the vehicle increases.

15. A control apparatus of a vehicle, the control apparatus being characterized by comprising:
a steering apparatus including a steering wheel operated in order to turn the vehicle and a steering angle sensor that detects a steering angle of the steering wheel, the steering apparatus steering a steered wheel in accordance with operation of the steering wheel;
a controller configured to set a steering angle acceleration based on the steering angle detected by the steering angle sensor, and control vehicle motion when the steering wheel is operated to be turned, wherein
the controller is configured to suppress a rise of lateral acceleration of the vehicle based on the steering angle acceleration in order to control the vehicle motion so as to suppress reduction of an operation velocity of the steering wheel caused by a driver due to the lateral acceleration of the vehicle that rises in accordance with the turning operation of the steering wheel,
wherein
the vehicle includes a driving seat of which position is adjustable in a vehicle front-rear direction; and
the controller is configured to suppress the rise of the lateral acceleration of the vehicle more strongly when a vehicle front-rear position of the driving seat is at a front position than when the vehicle front-rear position of the driving seat is not at the front position.

* * * * *